(12) United States Patent
Salsich

(10) Patent No.: US 10,734,918 B2
(45) Date of Patent: Aug. 4, 2020

(54) SYSTEMS AND METHODS FOR EFFICIENT PROVISION OF ARC WELDING POWER SOURCE

(71) Applicant: Illinois Tool Works Inc., Glenview, IL (US)

(72) Inventor: Anthony Van Bergen Salsich, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 552 days.

(21) Appl. No.: 15/386,674

(22) Filed: Dec. 21, 2016

(65) Prior Publication Data

US 2017/0187305 A1    Jun. 29, 2017

Related U.S. Application Data

(60) Provisional application No. 62/271,811, filed on Dec. 28, 2015.

(51) Int. Cl.
*B23K 9/00* (2006.01)
*B23K 9/095* (2006.01)
(Continued)

(52) U.S. Cl.
CPC ......... *H02M 7/53871* (2013.01); *B23K 9/013* (2013.01); *B23K 9/095* (2013.01);
(Continued)

(58) Field of Classification Search
CPC ........ B23K 9/10; B23K 9/1043; B23K 9/095; B23K 9/1012; B23K 9/013; B23K 9/16
(Continued)

(56) References Cited

U.S. PATENT DOCUMENTS 3,689,734 A    9/1972  Burley
3,689,737 A    9/1972  Eckles
(Continued)

FOREIGN PATENT DOCUMENTS

EP    0319669    6/1989
EP    0970775    1/2000
(Continued)

OTHER PUBLICATIONS

International Search Report from PCT application No. PCT/US2016/068401, dated Apr. 13, 2017, 11 pgs.
(Continued)

*Primary Examiner* — Brian W Jennison
(74) *Attorney, Agent, or Firm* — McAndrews, Held & Malloy, Ltd.

(57) ABSTRACT

A welding or cutting device includes a first transistor coupled between a first node and a second node. The first transistor controls current and voltage provided to an inductor during a welding or cutting operation. The welding or cutting device also includes a first diode coupled in series with the first transistor between the second node and a third node, and a second diode coupled in parallel with the first transistor and the first diode between the first node and a fourth node. Additionally, the welding or cutting device includes a second transistor coupled in series with the second diode and in parallel with the first transistor and the first diode between the fourth node and the third node. The second transistor controls a voltage applied to a transistor during a freewheeling operation of the inductor. Further, the welding or cutting device includes the inductor arranged between the second node and the fourth node and coupled to a first terminal of an output and a second terminal of the output coupled to the fourth node. Moreover, the welding or cutting device includes a bus capacitor coupled in parallel (Continued)

with the first transistor and the first diode between the third node and the first node.

25 Claims, 14 Drawing Sheets

(51) Int. Cl.
| | |
|---|---|
| *H02M 7/5387* | (2007.01) |
| *B23K 9/013* | (2006.01) |
| *B23K 9/10* | (2006.01) |
| *H02M 3/158* | (2006.01) |
| *B23K 9/16* | (2006.01) |

(52) U.S. Cl.
CPC .............. *B23K 9/1043* (2013.01); *B23K 9/16* (2013.01); *H02M 3/158* (2013.01); *H02M 7/5387* (2013.01)

(58) Field of Classification Search
USPC ...................................................... 219/130.21
See application file for complete search history.

(56) References Cited

U.S. PATENT DOCUMENTS

| | | | |
|---|---|---|---|
| 4,359,622 A | 11/1982 | Dostoomian | |
| 4,384,188 A | 5/1983 | Wright | |
| 4,438,317 A | 3/1984 | Ueguri | |
| 4,485,293 A | 11/1984 | Tabata | |
| 4,521,671 A | 6/1985 | Fronius | |
| 4,544,826 A | 10/1985 | Nakanishi | |
| 4,742,208 A | 5/1988 | Overman | |
| 4,749,935 A | 6/1988 | Osborne | |
| 4,794,232 A | 12/1988 | Kimbrough | |
| 4,866,247 A | 9/1989 | Parks | |
| 4,876,433 A | 10/1989 | Kashima et al. | |
| 4,894,598 A | 1/1990 | Daggett | |
| 4,947,021 A | 8/1990 | Stava | |
| 5,059,766 A | 10/1991 | Gilliland | |
| 5,196,668 A | 3/1993 | Kobayashi | |
| 5,278,390 A | 1/1994 | Blankenship | |
| 5,315,533 A | 5/1994 | Stich | |
| 5,357,078 A | 10/1994 | Smith | |
| 5,591,355 A | 1/1997 | Ishikawa | |
| 5,600,550 A | 2/1997 | Cook, II | |
| 5,864,116 A | 1/1999 | Baker | |
| 5,991,169 A | 11/1999 | Kooken | |
| 6,015,964 A | 1/2000 | Baker | |
| 6,111,216 A | 8/2000 | Stava | |
| 6,115,273 A | 9/2000 | Geissler | |
| 6,160,241 A | 12/2000 | Stava | |
| 6,160,722 A | 12/2000 | Thommes | |
| 6,172,888 B1 | 1/2001 | Jochi | |
| 6,225,598 B1 | 5/2001 | Nihei | |
| 6,278,357 B1 | 8/2001 | Croushore | |
| 6,321,139 B1 | 11/2001 | Terada | |
| 6,321,167 B1 | 11/2001 | Jochi | |
| 6,359,258 B1 | 3/2002 | Blankenship | |
| 6,365,874 B1 | 4/2002 | Stava | |
| 6,596,970 B2 | 7/2003 | Blankenship | |
| 6,649,869 B2 | 11/2003 | Reynolds | |
| 6,710,297 B1 | 3/2004 | Artelsmair | |
| 6,717,108 B2 | 4/2004 | Hsu | |
| 6,735,537 B2 | 5/2004 | Liu | |
| 6,930,279 B2 | 8/2005 | Myers | |
| 7,049,545 B2 | 5/2006 | Matus | |
| 7,064,290 B2 | 6/2006 | Blankenship | |
| 7,091,445 B2 | 8/2006 | Myers | |
| 7,105,772 B2 | 9/2006 | Houston | |
| 7,141,759 B2 | 11/2006 | Mela | |
| 7,173,214 B2 | 2/2007 | Nadzam | |
| 7,173,393 B2 | 2/2007 | Maeda | |
| 7,183,517 B2 | 2/2007 | Albrecht | |
| 7,301,308 B2 | 11/2007 | Aker | |
| 7,952,310 B2 | 5/2011 | Hamasaki | |
| 8,049,140 B2 | 11/2011 | Kawamoto | |
| 8,199,536 B2 | 6/2012 | Mangraviti | |
| 8,225,598 B2 | 7/2012 | Haeberer | |
| 8,269,141 B2 | 9/2012 | Daniel | |
| 8,278,882 B2 | 10/2012 | Gotou | |
| 8,410,398 B2 | 4/2013 | Daniel | |
| 8,455,794 B2 | 6/2013 | Vogel | |
| 8,456,726 B2 | 6/2013 | Watanabe | |
| 8,525,077 B2 | 9/2013 | Peters | |
| 8,546,726 B2 | 10/2013 | Vogel | |
| 8,581,147 B2 | 11/2013 | Kooken | |
| 8,637,786 B2 | 1/2014 | Salsich | |
| 8,653,413 B2 | 2/2014 | Vogel | |
| 8,785,816 B2 | 7/2014 | Kooken | |
| 8,884,188 B2 | 11/2014 | Vogel | |
| 8,952,293 B2 | 2/2015 | Vogel | |
| 9,018,802 B2 | 4/2015 | Sun | |
| 9,144,856 B2 | 9/2015 | Vogel | |
| 9,492,880 B2 | 11/2016 | Vogel | |
| 9,960,703 B2* | 5/2018 | Hatakeyama | H02M 3/158 |
| 2005/0057210 A1* | 3/2005 | Ueda | H02M 5/458 |
| | | | 318/801 |
| 2006/0049163 A1 | 3/2006 | Gotoh | |
| 2006/0054610 A1 | 3/2006 | Morimoto | |
| 2006/0175313 A1 | 8/2006 | Kooken | |
| 2006/0226130 A1 | 10/2006 | Kooken | |
| 2006/0243716 A1 | 11/2006 | Stava | |
| 2007/0030612 A1 | 2/2007 | Kamath | |
| 2007/0181547 A1 | 8/2007 | Vogel | |
| 2007/0187376 A1 | 8/2007 | Albrecht | |
| 2007/0215585 A1 | 9/2007 | OConnor | |
| 2008/0078812 A1 | 4/2008 | Peters | |
| 2008/0296276 A1 | 12/2008 | Schartner | |
| 2009/0039063 A1 | 2/2009 | Madsen | |
| 2009/0230941 A1* | 9/2009 | Vogel | B23K 9/091 |
| | | | 323/305 |
| 2010/0170880 A1 | 7/2010 | Hsu | |
| 2010/0320182 A1* | 12/2010 | Madsen | B23K 9/1043 |
| | | | 219/130.1 |
| 2011/0108536 A1 | 5/2011 | Inada | |
| 2011/0220630 A1 | 9/2011 | Speilman | |
| 2012/0000895 A1 | 1/2012 | Sato | |
| 2014/0374397 A1* | 12/2014 | Vogel | B23K 9/1043 |
| | | | 219/130.1 |

FOREIGN PATENT DOCUMENTS

| | | |
|---|---|---|
| EP | 1138429 | 10/2001 |
| EP | 1671737 A2 | 6/2006 |
| FR | 2850463 | 7/2004 |
| GB | 2393338 | 3/2004 |
| JP | S61273260 | 12/1986 |
| JP | 2001276971 | 10/2001 |
| WO | 2008140398 | 1/2008 |

OTHER PUBLICATIONS

International Search Report for application No. PCT/US2010/034500 dated Aug. 27, 2010.
Canadian Office Action Appln. No. 3,006,592 dated Mar. 26, 2019.

* cited by examiner

SYSTEMS AND METHODS FOR EFFICIENT PROVISION OF ARC WELDING POWER SOURCE

CROSS REFERENCE TO RELATED APPLICATIONS

This application is a Non-provisional U.S. patent application of U.S. Provisional Application No. 62/271,811, entitled "Systems and Methods for Efficient Provision of Arc Welding Power Source", filed Dec. 28, 2015, which is hereby incorporated by reference in its entirety for all purposes.

BACKGROUND

The present disclosure relates generally to welding power supplies, and more particularly, to systems and methods for controlling current flow through an output load of a power control circuit.

Welding power supply circuits typically convert power from a primary source to an output suitable for welding operations. The output power is provided at an appropriate voltage or current level and may be controlled and regulated according to the process requirements. Some welding processes require the output to be AC. For instance, typical high current AC outputs for gas tungsten arc welding (GTAW) or submerged arc welding (SAW) may require circuitry that efficiently generates a square wave output with a magnitude of several hundreds of amperes. Typical circuit topologies designed to meet this need include a buck converter that steps down a supplied DC voltage, a full bridge inverter that converts the stepped down DC voltage to an AC output, and an output clamp circuit that suppresses output energy caused by parasitic output inductance from welding cables during output current reversal.

Since welding operations generally require high current levels and low voltage levels at the output, an important design criterion of typical welding and plasma cutting power supply circuits is the limitation of power losses in the circuit. However, it is now recognized that traditional power supply circuits include a combination of components (e.g., buck converter, full bridge inverter, and output clamp circuit) that typically contain multiple transistors and diodes, which greatly contribute to power losses in the circuit, leading to inefficiencies in the circuit design. Indeed, it is now recognized that there exists a need for circuits that reduce the power losses in the circuit and increase the efficiency of the welding power supply.

BRIEF DESCRIPTION

In an embodiment, a welding or cutting circuit includes an input leg including a capacitor coupled between a high bus and a low bus. Additionally, the welding or cutting circuit includes a buck converter coupled in parallel with the input leg. The buck converter includes a first transistor, a first diode, and an output electrically coupled to a node between the first transistor and the first diode, and the buck converter converts input voltage to current in an inductor coupled to the output of the buck converter. Further, the welding or cutting circuit includes a steering leg coupled in parallel with the input leg. The steering leg controls a rate at which the current in the inductor decreases.

In an embodiment, a method of controlling current flow through an output load of a welding or cutting circuit includes pulse width modulating voltage from a voltage input leg of a welding or cutting system by switching a first transistor to provide a level of current through an inductor and an output of the welding or cutting circuit. The first transistor is arranged in series with a first diode in a buck converter formation, and the inductor extends from a node between the first transistor and the first diode to the output load of the welding or cutting circuit. Additionally, the method includes controlling a current flow through the inductor and the output of the welding or cutting circuit at least in part by switching a second transistor of the welding or cutting circuit between an open configuration and a closed configuration.

In an embodiment, a welding or cutting circuit includes an input leg. The input leg includes a capacitor coupled between a high bus and a low bus. Additionally, the welding or cutting circuit includes a buck converter coupled in parallel with the input leg. The buck converter includes a first transistor, a second transistor, and an output electrically coupled to a node between the first transistor and the second transistor, and the buck converter converts input voltage to current in an inductor coupled to the output of the buck converter. Further, the welding or cutting circuit includes a steering leg coupled in parallel with the input leg, and the steering leg hysteretically controls a rate at which the current in the inductor decreases.

DRAWINGS

These and other features, aspects, and advantages of the present disclosure will become better understood when the following detailed description is read with reference to the accompanying drawings, wherein.

Figure 17:
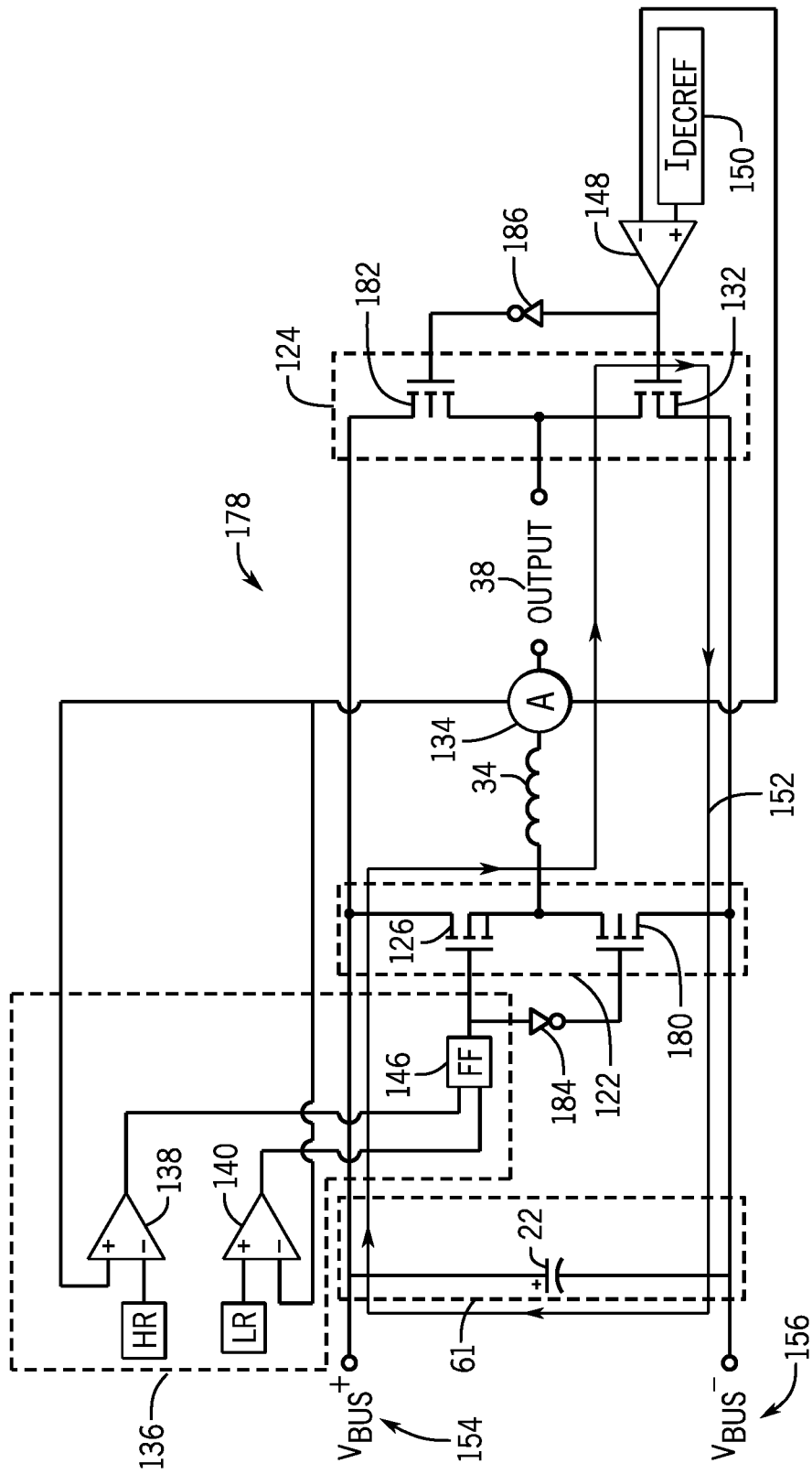
FIG. 17 is a circuit diagram illustrating an embodiment of an output control circuit with four-quadrant hysteretic control in accordance with aspects of the present disclosure.
Figure 19:
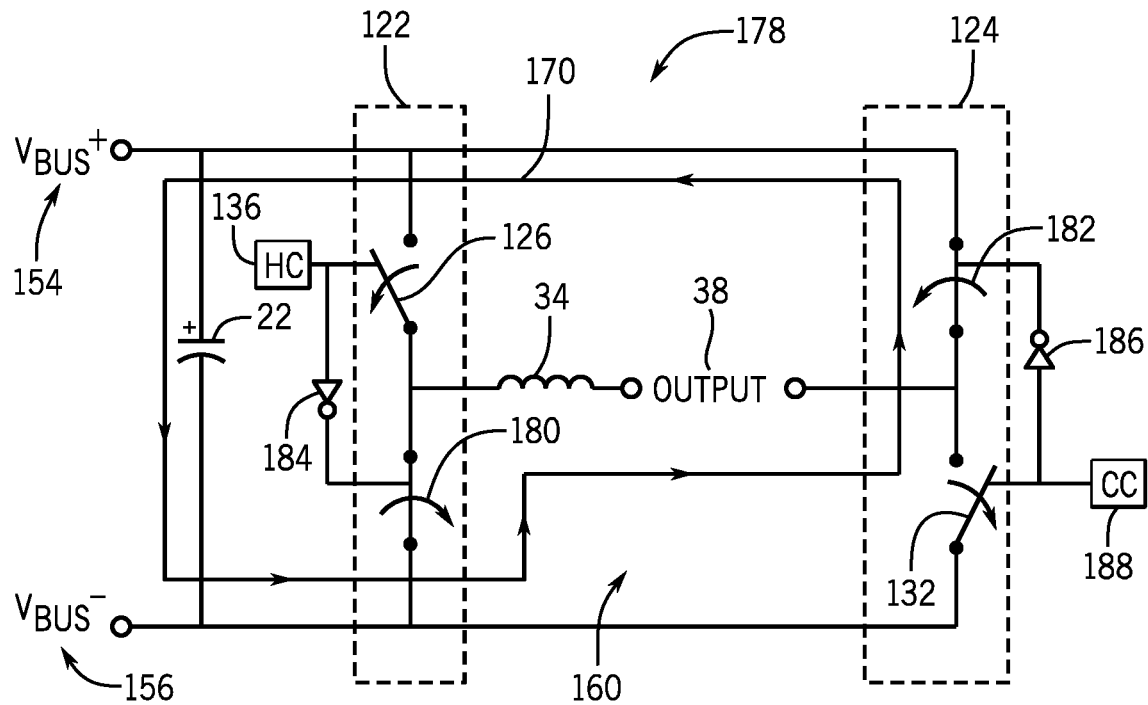
Figure 20:
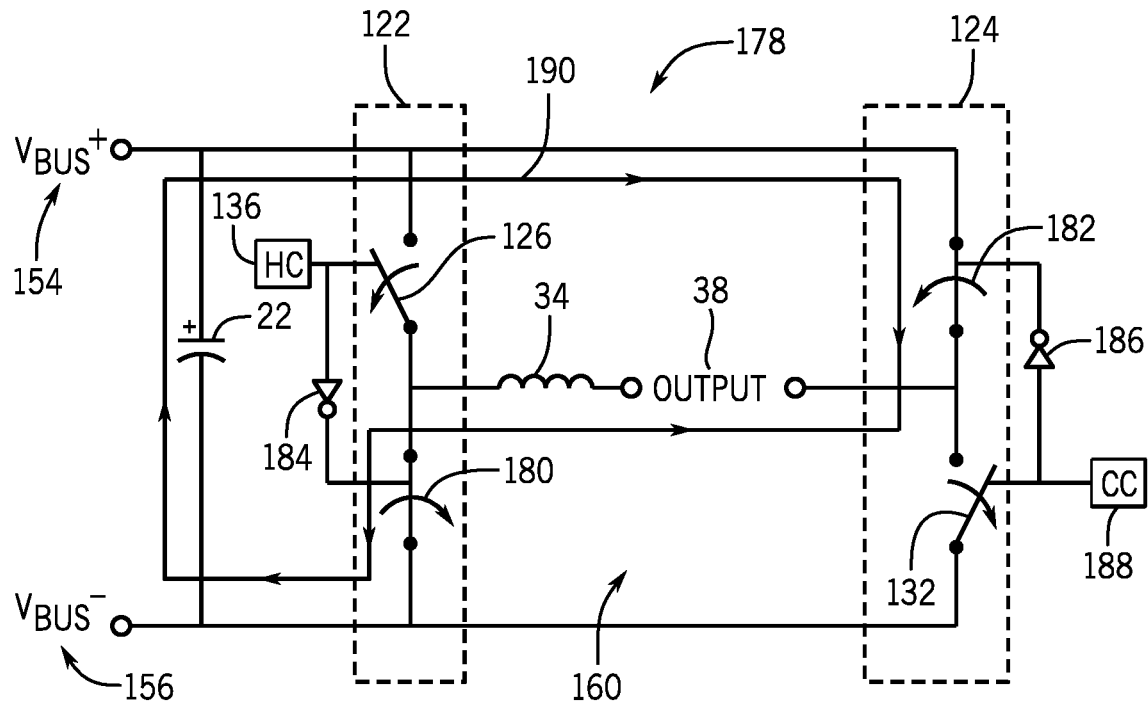

FIG. 19 is a circuit diagram illustrating an embodiment of the output control circuit of FIG. 17 with current flowing through the output load from left to right in accordance with aspects of the present disclosure; and FIG. 20 is a circuit diagram illustrating an embodiment of the output control circuit of FIG. 17 with current flowing through an output load from right to left in accordance with aspects of the present disclosure.

DETAILED DESCRIPTION

Figure 1:
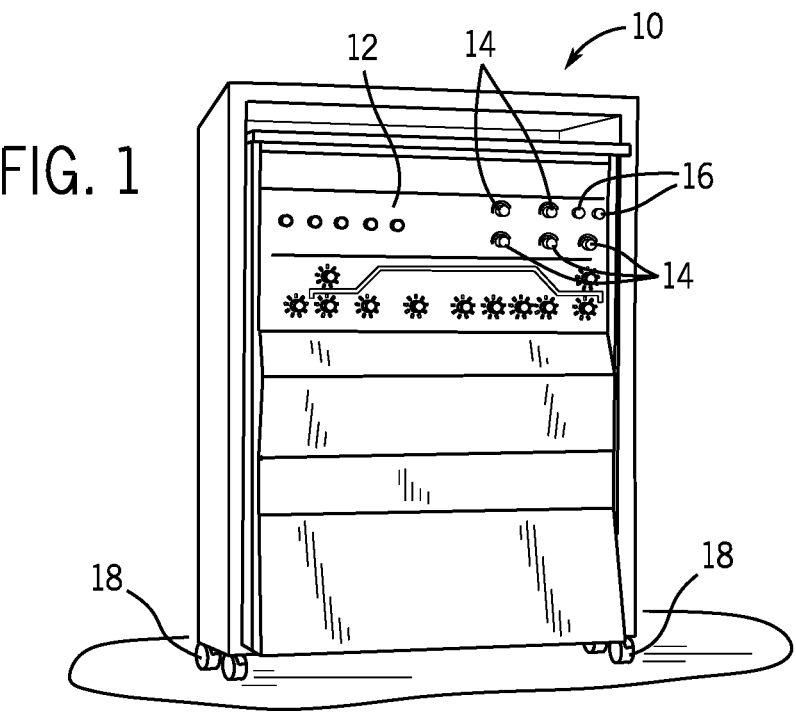
FIG. 1 illustrates an exemplary welding, cutting or heating power supply in accordance with aspects of the present disclosure.

FIG. 1 illustrates an exemplary welding, cutting or heating power supply 10, which functions to power and control a welding, cutting or heating operation in accordance with aspects of the present disclosure. The power supply unit 10 in the illustrated embodiment contains a control panel 12 through which a user may control the supply of materials, such as power, gas flow, and so forth, to the welding, cutting or heating operation through knobs 14 or other panel components. The power supply 10 contains ports 16, which may communicatively couple the power supply 10 to other system components, such as a torch, a work lead, a wall power outlet, and so forth. The portability of the unit 10 depends on a set of wheels 18, which enable the user to easily move the power supply unit 10 to the location of a workpiece.

Figure 2:
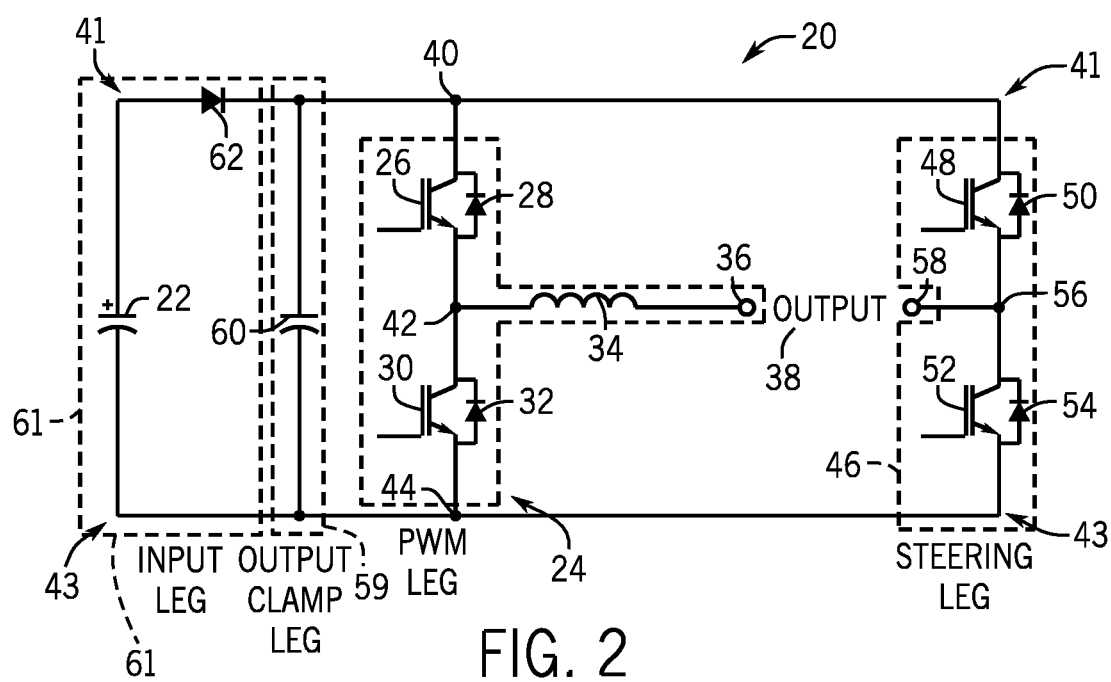
FIG. 2 is a circuit diagram illustrating an exemplary embodiment of the output power control circuit of the welding power supply in accordance with aspects of the present disclosure.

FIG. 2 is a circuit diagram illustrating one embodiment of an output power control circuit 20 of the welding power supply 10 in accordance with aspects of the present disclosure. The power control circuit 20 converts an unregulated DC input to a regulated AC output as needed for the welding, cutting or heating operation being performed. For instance, typical submerged arc welding (SAW) operations may require a regulated high current square wave output of several hundreds of amperes. However, primary power sources, such as a wall outlet, provide an unregulated AC output that is insufficient for a SAW operation. Therefore, it is now recognized that circuitry must convert the output of the primary power source to an output suitable for the welding, cutting or heating operation being performed. In operation, the power control circuit 20 illustrated in FIG. 2 efficiently converts unregulated DC inputs to a first capacitor 22 from the primary power supply to regulated AC outputs for the welding, cutting or heating operation. In the following discussion, the power control circuit 20 illustrated in FIG. 2 may be broken up into legs and sides for explanatory purposes. However, one skilled in the art would understand that the components of the circuit 20 may be arranged and/or grouped differently while retaining the overall function of the circuit 20.

A pulse width modulation (PWM) leg 24 modulates current received from the first capacitor 22 such that the received unregulated DC current is converted to a regulated DC current. The PWM leg 24 includes a first transistor 26 and a first diode 28 coupled in parallel, a second transistor 30 and a second diode 32 coupled in parallel, an inductor 34, and a first terminal 36 of an output 38. The first transistor 26 and the first diode 28 may be positioned in between a first node 40 and a second node 42. As illustrated in FIG. 2, the first node 40 may be located such that it is positioned on a first outer edge 41 of the circuit 20. The second node 42 is located below the first outer edge 41 of the circuit 20 but above a second outer edge 43 of the circuit 20. The second transistor 30 and the second diode 32 may be positioned in between the second node 42 and a third node 44, which may be located such that it is positioned on the second outer edge 43 of the circuit 20. The inductor 34 may be positioned in between the second node 42 and the first terminal 36 of the output 38 and parallel to the first outer edge 41 and the second outer edge 43 of the circuit 20.

The PWM leg 24 alternates switching of the first transistor 26 or the second transistor 30 to increase or decrease current at the output 38 as dictated by the demands of the welding or plasma cutting operation. In some embodiments, the first transistor 26, the second diode 32, and the inductor 34 may be configured to function as a buck converter. Similarly, in some embodiments, the second transistor 30, the first diode 28, and the inductor 34 may be configured to function as a buck converter, transferring energy from an input to an output by storing and subsequently releasing energy in the inductor 34. Taken together, the first transistor 26, the first diode 28, the second transistor 30, the second diode 32, and the inductor 34 may function as a bidirectional buck converter, which converts the DC voltage across the first capacitor 22 to a regulated DC current in the inductor 34.

A steering leg 46, which includes a third transistor 48 and a third diode 50 coupled in parallel and a fourth transistor 52 and a fourth diode 54 coupled in parallel, forms a half bridge inverter that determines the direction of current flow through the inductor 34. The steering leg 46 is positioned between the first outer edge 41 and the second outer edge 43 of the circuit 20. During operation, the steering leg 46 facilitates current flow either from right to left through the inductor 34 or from left to right through the inductor 34 by turning the third transistor 48 and the fourth transistor 52 on and off. The third transistor 48 and the third diode 50 may be positioned in between the first node 40 and a fourth node 56. The fourth transistor 52 and the fourth diode 54 may be positioned in between the fourth node 56 and the third node 44 such that they exist in series with the first node 40, which is positioned on the first outer edge 41 of the circuit 20, and the fourth node 56, which is positioned in between the first outer edge 41 of the circuit 20 and the second outer edge 43 of the circuit 20. A second terminal 58 of the output 38 extending from the fourth node 56 in parallel with the first outer edge 41 and the second outer edge 43 of the circuit 20 may be configured to receive current from the steering leg 46.

An output clamp leg 59 includes a second capacitor 60 that is configured to function as an output clamp circuit, which suppresses the energy in a parasitic output inductance of the welding or cutting cables during polarity reversal. The output clamp leg 59 is positioned between and connects the first outer edge 41 and the second outer edge 43 of the circuit 20. In some embodiments, the capacity of the second capacitor 60 is much less than the capacity of the first capacitor 22. In some embodiments, the peak current in the second capacitor 60 during polarity reversal may be the current in the inductor 34 and the parasitic output inductance of the welding or cutting cables.

An input leg 61 includes the first capacitor 22 and a blocking diode 62 arranged in series. As illustrated in FIG. 2, the blocking diode 62 may be positioned on the first outer edge 41 of the circuit 20 and the first capacitor 22 may be positioned in between the first outer edge 41 and the second outer edge 43 of the circuit 20. The input leg 61 is positioned between the first outer edge 41 and the second outer edge 43 of the circuit 20. The first capacitor 22 is configured to receive power from a primary power source that may include a line frequency step down transformer and a rectifier. The transformer may be single phase or three phase and may output 50 Hz or 60 Hz. The transformer may have multiple primary taps to accommodate multiple input voltages. The blocking diode 62 allows the second capacitor 60 to resonate with the series combination of the inductor 34 and the parasitic output inductance during polarity reversal as described in more detail below.

Figure 3:
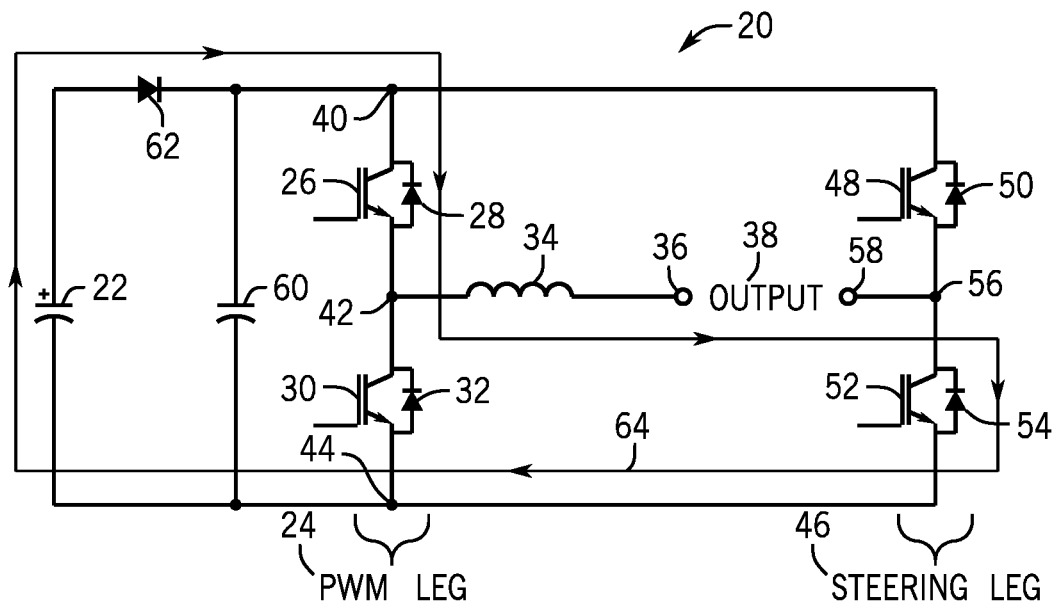
FIG. 3 is a circuit diagram illustrating an exemplary embodiment of the output power control circuit with current flow established from left to right through the output load in accordance with aspects of the present disclosure.
Figure 4:
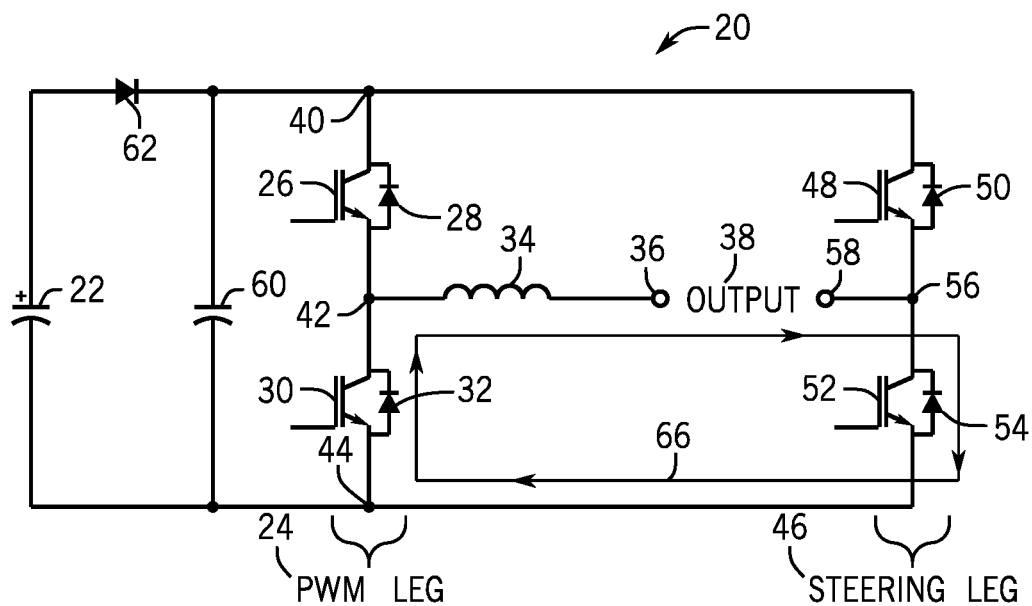
FIG. 4 is a circuit diagram illustrating an exemplary embodiment of the output power control circuit with current flow freewheeling from left to right through the output load in accordance with aspects of the present disclosure.

FIG. 3 is a circuit diagram illustrating an exemplary embodiment of the output power control circuit 20 with a current flow 64 established from left to right through the inductor 34 (i.e. state 1). To establish the left to right current flow 64 through the inductor 34, the fourth transistor 52 is turned on, and the first transistor 26 is pulse width modulated to regulate the magnitude of the current through the inductor 34. The forward path of current 64 originates from the first capacitor 22 and flows through the blocking diode 62, the first node 40, the first transistor 26, the inductor 34, the first terminal 36 of the output 38, the output 38, the second terminal 58 of the output 38, the fourth node 56, the fourth transistor 52, the third node 44 and back to the first capacitor 22. When the pulse width modulation of the first transistor 26 dictates that it is off, a freewheel current path 66, as illustrated in FIG. 4, is established to allow the magnitude of the current flowing through the inductor 34 to decrease (i.e. state 2). The freewheel current path 66 flows from left to right through the inductor 34 and is through the second diode 32, the second node 42, the inductor 34, the first terminal 36 of the output 38, the output 38, the second terminal 58 of the output 38, the fourth node 56, the fourth transistor 52, and the third node 44. The second transistor 30, the first diode 28, the third diode 50, and the third transistor 48 are not used when DC current is flowing from left to right through the inductor 34.

Figure 5:
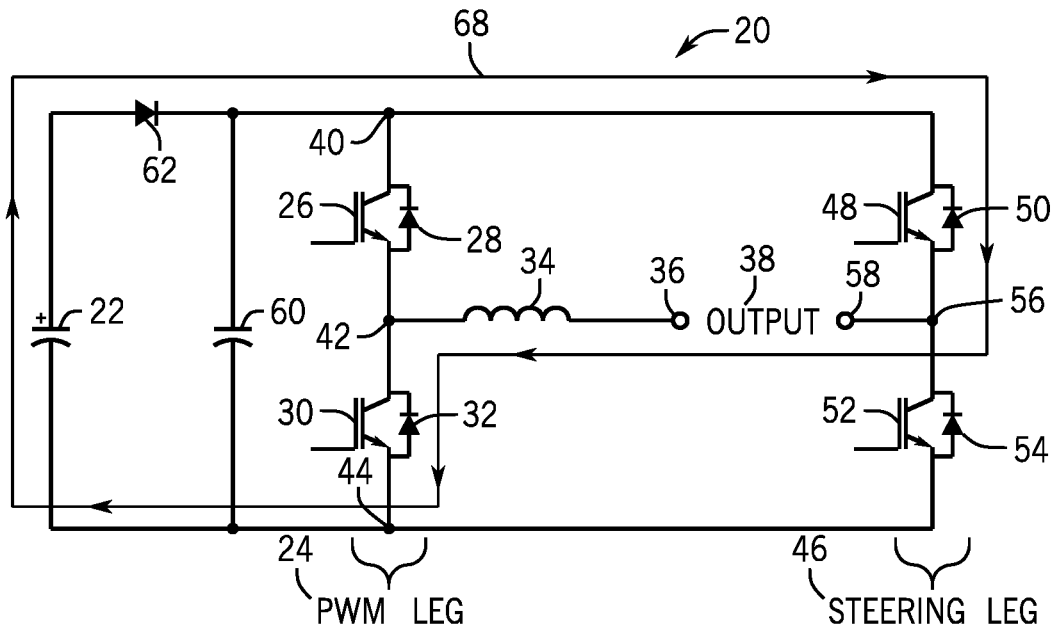
FIG. 5 is a circuit diagram illustrating an exemplary embodiment of the output power control circuit with current flow established from right to left through the output load in accordance with aspects of the present disclosure.
Figure 6:
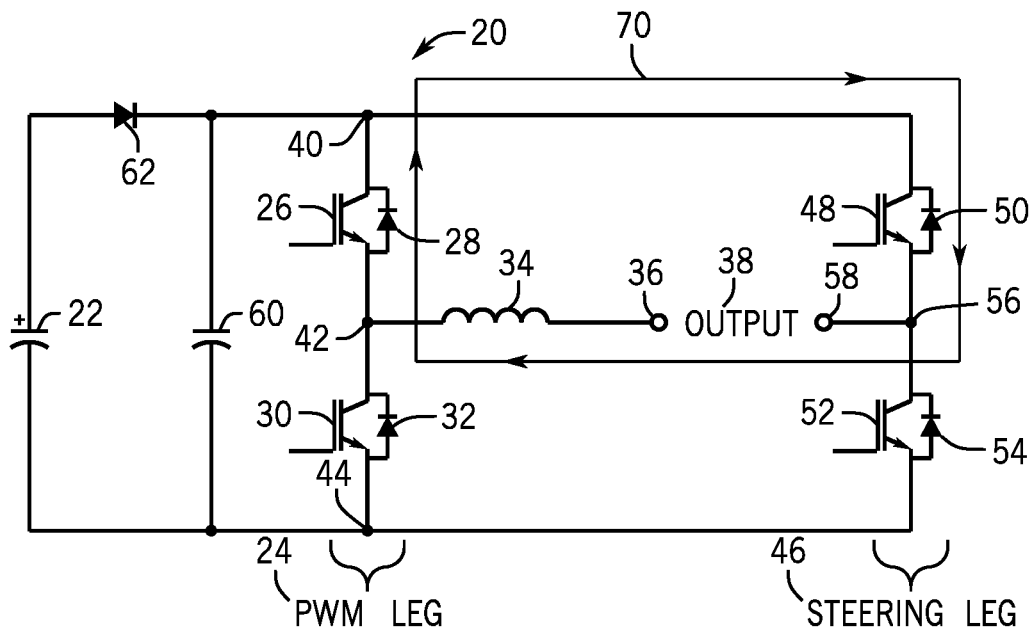
FIG. 6 is a circuit diagram illustrating an exemplary embodiment of the output power control circuit with current flow freewheeling from right to left through the output load in accordance with aspects of the present disclosure.

FIG. 5 is a circuit diagram illustrating an exemplary embodiment of the output power control circuit 20 with a current flow 68 established from right to left through the inductor 34 (i.e. state 5). To establish the right to left current flow 68 through the inductor 34, the third transistor 48 is turned on, and the second transistor 30 is pulse width modulated to regulate the magnitude of the current through the inductor 34. The forward path of current 68 originates from the first capacitor 22 and flows through the blocking diode 62, the first node 40, the third transistor 48, the second terminal 58 of the output 38, the output 38, the first terminal 36 of the output 38, the inductor 34 the second node 42, the second transistor 30, the third node 44 and back to the first capacitor 22. When the pulse width modulation of the second transistor 30 dictates that it is off, a freewheel current path 70, as illustrated in FIG. 6, is established to allow the magnitude of the current flowing through the inductor 34 to decrease (i.e. state 6). The freewheel current path 70 flows from right to left through the inductor 34 and is through the first diode 28, the first node 40, the third transistor 48, the fourth node 56, the second terminal 58 of the output 38, the output 38, the first terminal 36 of the output 38, the inductor 34, and the second node 42. The first transistor 26, the second diode 32, the third diode 50, and the fourth diode 54 are not used when DC current is flowing from right to left through the inductor 34.

Figure 7:
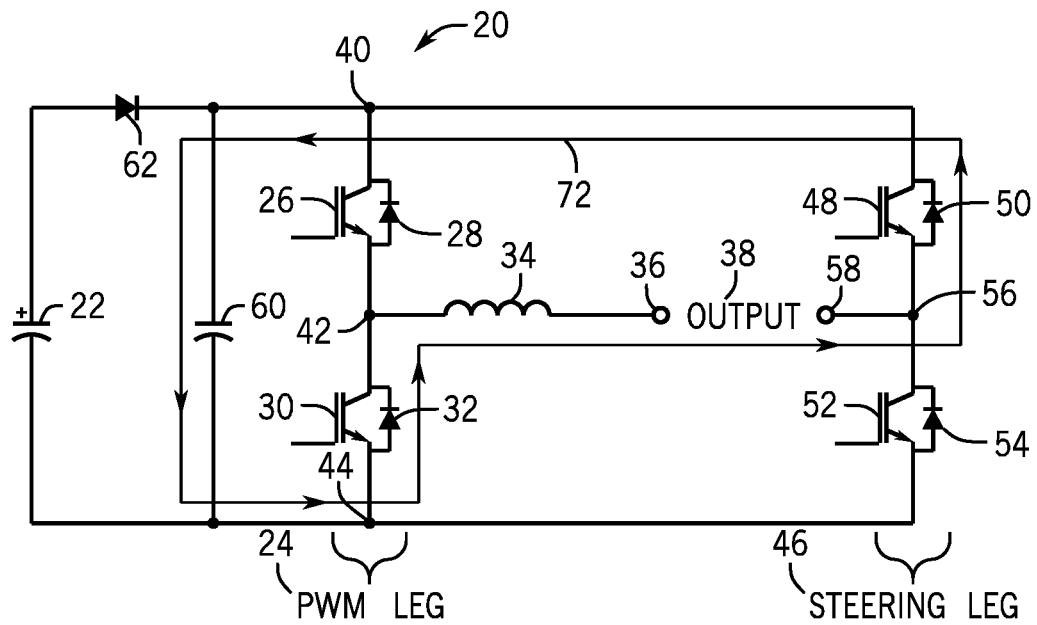
FIG. 7 is a circuit diagram of an exemplary embodiment of the output power control circuit illustrating the first step of current reversal from left to right to right to left through the output load in accordance with aspects of the present disclosure.

In some embodiments, once current flow has been established either in the left to right current path 64 or in the right to left current path 68 through the inductor 34, the direction of the current flow may be reversed. For instance, if current flow has been established in the left to right current path 64 through the inductor 34, the direction of the current flow can be reversed by turning all the transistors 26, 30, 48, 52 off. A first intermediate current flow path 72 illustrated in FIG. 7 is established wherein the current continues to flow from left to right through the inductor 34 (i.e. state 3). The first intermediate current flow path 72 flows from the inductor 34 through the first terminal 36 of the output 38, the output 38, the second terminal of the output 58, the fourth node 56, the third diode 50, the first node 40, the second capacitor 60, the third node 44, the second diode 30, and the second node 42. The inductor 34 releases the energy it stored during the left to right current flow 64, charging the second capacitor 60 to a voltage greater than the voltage of the first capacitor 22, at which point the blocking diode 62 begins to block. The second transistor 30 and the third transistor 48 are turned on to allow the second capacitor to unload its energy back into the output load 38 and the inductor 34 after the current in the inductor 34 reaches zero.

Figure 8:
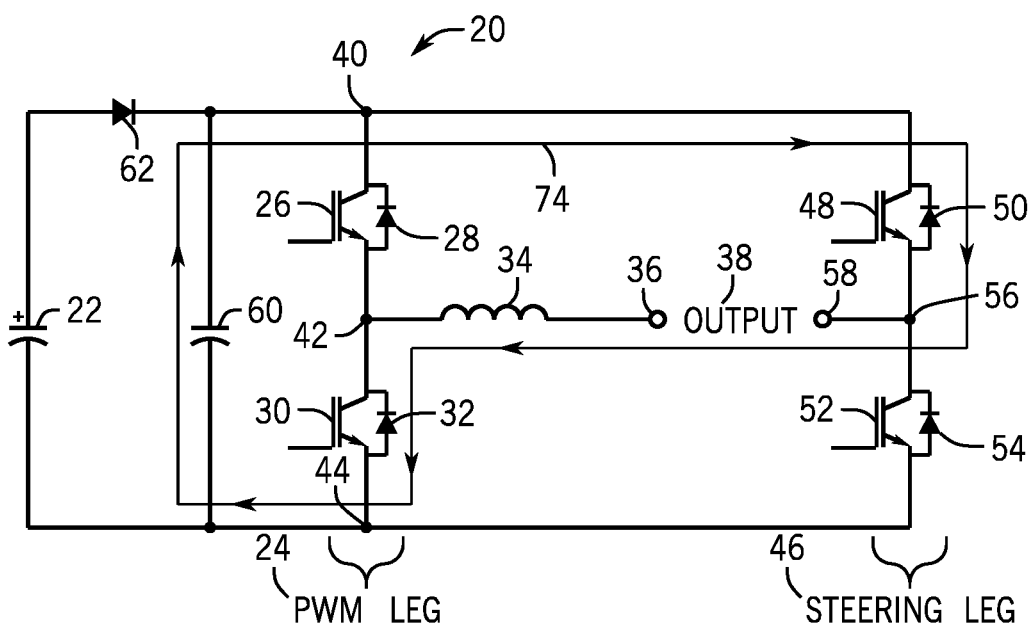
FIG. 8 is a circuit diagram of an exemplary embodiment of the output power control circuit illustrating the second step of current reversal from left to right to right to left through the output load in accordance with aspects of the present disclosure.

When the current in the inductor 34 reaches zero, the voltage on the second capacitor 60 is at an upper limit. Subsequently, the energy built up in the second capacitor 60 will begin to discharge, reversing the direction of the current flow and establishing a current flow path 74 from right to left through the inductor 34, as illustrated in FIG. 8 (i.e. state 4). Since the second transistor 30 and the third transistor 48 have been turned on, current will flow from the second capacitor 60 through the first node 40, the third transistor 48, the fourth node 56, the second terminal of the output 58, the output 38, the first terminal of the output 36, the inductor 34, the second transistor 30, and the third node 44. When the voltage on the second capacitor 60 discharges to the voltage on the first capacitor 22, current flow will be established through the inductor 34 from right to left at approximately the same magnitude as prior to polarity reversal, slightly reduced by circuit losses. Subsequently, the third transistor 48 remains on and the second transistor 30 is pulse width modulated to regulate the current flow through the inductor 34 and reestablish the current path from right to left as previously shown in FIG. 5.

Figure 9:
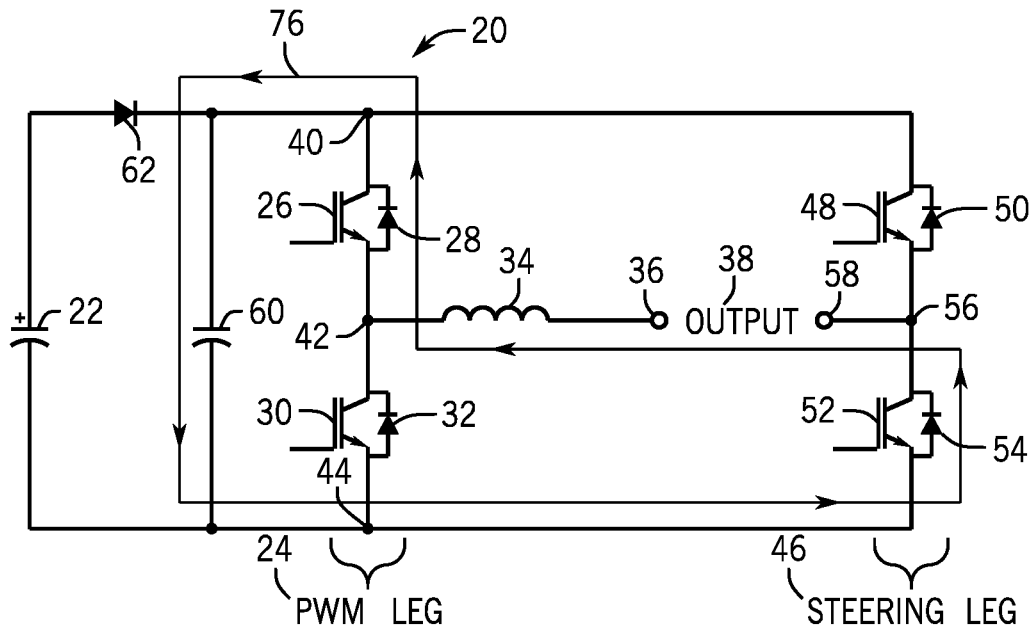
FIG. 9 is a circuit diagram of an exemplary embodiment of the output power control circuit illustrating the first step of current reversal from right to left to left to right through the output load in accordance with aspects of the present disclosure.

Once current flow has been reestablished in the right to left current path 68 through the inductor 34, the direction of the current flow can be reversed by turning all the transistors 26, 30, 48, 52 off. A first intermediate current flow path 76 illustrated in FIG. 9 is established wherein the current continues to flow from right to left through the inductor 34 (i.e. state 7). The first intermediate current flow path 76 flows from the inductor 34 through the second node 42, the first diode 28, the first node 40, the second capacitor 60, the third node 44, the fourth diode 54, the fourth node 56, the second terminal 58 of the output 38, the output 38, and the first terminal of the output 36. The inductor 34 releases the energy it stored during the right to left current flow 68, charging the second capacitor 60 to a voltage greater than the voltage of the first capacitor 22, at which point the blocking diode 62 begins to block. The first transistor 26 and the fourth transistor 52 are turned on to allow the second capacitor to unload its energy back into the output load 38 and the inductor 34 after the current in the inductor 34 reaches zero.

Figure 10:
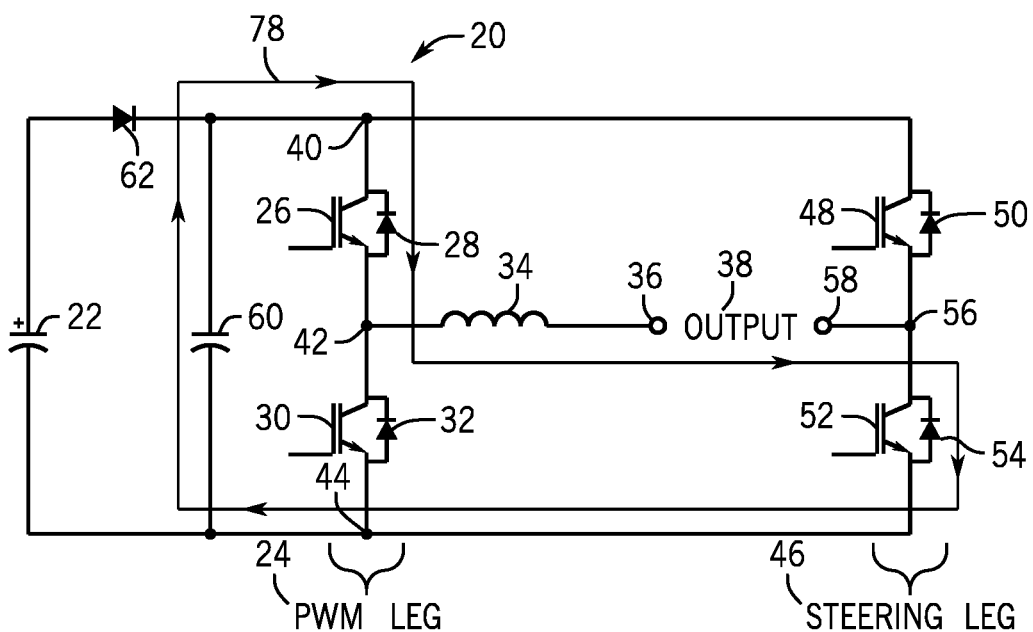
FIG. 10 is a circuit diagram of an exemplary embodiment of the output power control circuit illustrating the second step of current reversal from right to left to left to right through the output load in accordance with aspects of the present disclosure.

When the current in the inductor 34 reaches zero, the voltage on the second capacitor 60 is at an upper limit. Subsequently, the energy built up in the second capacitor 60 will begin to discharge, reversing the direction of the current flow and establishing a current flow path 78 from left to right through the inductor 34, as illustrated in FIG. 10 (i.e. state 8). Since the first transistor 26 and the fourth transistor 52 have been turned on, current will flow from the second capacitor 60 through the first node 40, the first transistor 26, the second node 42, the inductor 34, the first terminal of the output 36, the output 38, the second terminal of the output 58, the fourth node 56, the fourth transistor 52, and the third node 44. When the voltage on the second capacitor 60 discharges to the voltage on the first capacitor 22, current flow will be established through the inductor 34 from left to right at approximately the same magnitude as prior to polarity reversal, slightly reduced by circuit losses. Subsequently, the fourth transistor 52 remains on and the first transistor 26 is pulse width modulated to regulate the current flow through the inductor 34 and reestablish the current path from left to right as previously shown in FIG. 3.

Figure 11A:
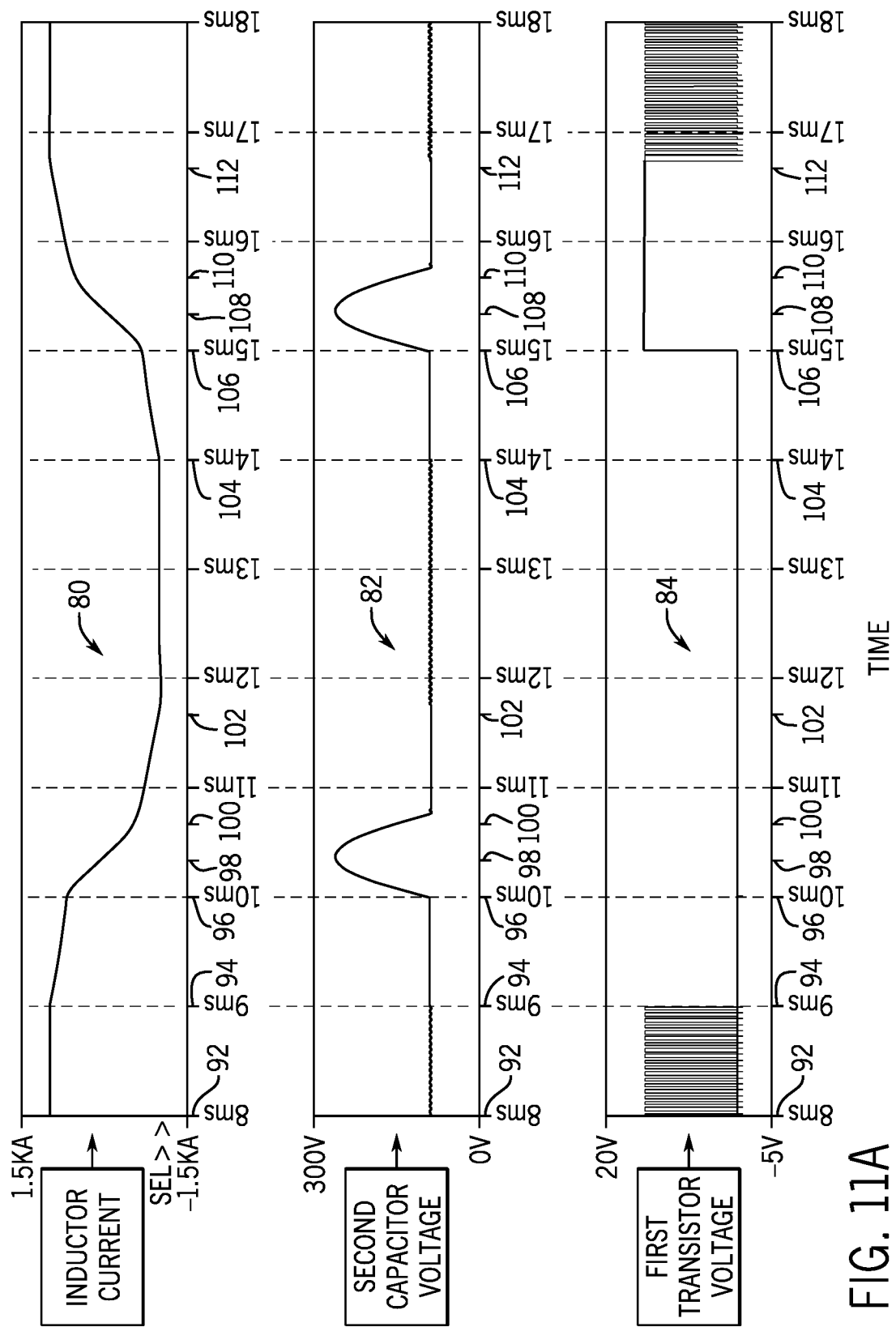
FIGS. 11A and 11B are graphical representations of exemplary waveforms generated during output power control circuit operation.
Figure 11B:
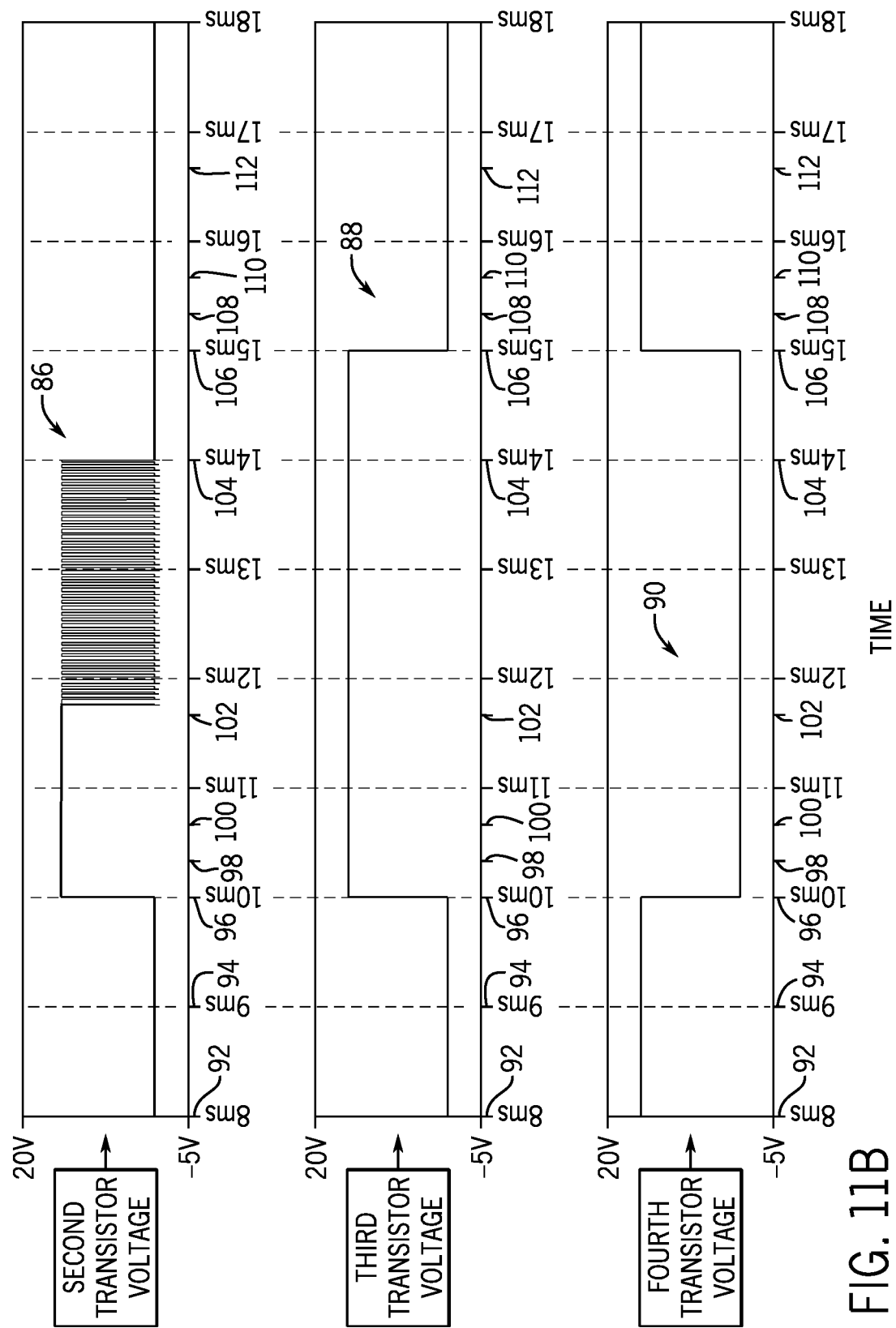

FIGS. 11A and 11B illustrate exemplary current and voltage waveforms generated during control circuit operation. In particular, FIGS. 11A and 11B illustrate an inductor current waveform 80, a second capacitor voltage waveform 82, a first transistor voltage waveform 84, a second transistor voltage waveform 86, a third transistor voltage waveform 88, and a fourth transistor voltage waveform 90. From an initial time 92 to a later time 94, the circuit 20 is switching between state 1 and state 2 to maintain the current at the output 38 at 1000 A flowing from left to right through the inductor 34 as previously described with respect to FIGS. 3-4. The fourth transistor 52 is on in both states 1 and 2 while the first transistor 26 is on in state 1 and off in state 2. A current at the output 38 appears to be a constant 1000 A but is actually increasing a few amps in state 1 and decreasing a few amps in state 2. From a time 94 to a later time 96, the circuit 20 remains exclusively in state 2, the fourth transistor 52 is the only transistor on, and the current at the output 38 is decreasing.

At the time 96, the fourth transistor 52 is turned off, and the circuit 20 is in state 3 as previously described with respect to FIG. 7. The second transistor 30 and the third transistor 48 are turned on in state 3 even though the current flow path is through the second diode 32 and the third diode 50. During state 3, the current at the output 38 rapidly decreases while the voltage on the second capacitor 60 increases. Subsequently, at a later time 98, the current at the output 38 reverses, and the voltage on the second capacitor 60 is at an upper limit. At the time 98, the circuit 20 enters state 4, as previously described with respect to FIG. 8. The current at the output 38 increases rapidly through the second capacitor 60, the second transistor 30, and the third transistor 48. The voltage on the second capacitor 60 begins to decrease.

Subsequently, at an approximate later time 100, the current at the output 38 has reversed and is flowing from right to left through the inductor 34. The voltage on the second capacitor 60 has reached its initial condition. From the approximate time 100 to an approximate time 102, the circuit 20 is in state 5, as previously described with respect to FIG. 5. The second transistor 30 and the third transistor 48 are on, and the current at the output 38 increases. At the time 102, the current at the output 38 has reached 1000 A and is flowing from right to left through the inductor 34. The circuit 20 is switching between states 5 and 6 to maintain the output current at 1000 A as previously described with respect to FIGS. 5-6. The second transistor 30 is on in state 5 while the current at the output is increasing a few amps.

From a time 104 to a later time 106, the circuit 20 is in state 6 as previously described with respect to FIG. 6. The third transistor 48 is on, the second transistor 30 is off, and the current at the output is decreasing a few amps. At the time 106, the third transistor 48 turns off, and the circuit is in state 7 as previously described with respect to FIG. 9. The first transistor 26 and the fourth transistor 52 turn on in state 7 even though the current flow is through the first diode 28 and the fourth diode 54. During state 7, the current at the output 38 rapidly decreases, while the voltage on the second capacitor 60 increases. At an approximate later time 108, the current at the output 38 reverses, and the voltage on the second capacitor 60 is at an upper limit. At the time 108, the circuit 20 enters state 8 as previously described with respect to FIG. 10. The current at the output increases rapidly through the second capacitor 60, the first transistor 26, and the fourth transistor 52. The voltage on the second capacitor 60 begins to decrease.

At an approximate time 110, the current at the output 38 has reversed, and current flow is from left to right through the inductor 34 while the voltage on the second capacitor 60 has reached its initial condition. From the approximate time 110 to an approximate time 112, the circuit 20 returns to state 1, wherein the first transistor 26 and the fourth transistor 52 are on, and the current at the output 38 increases. At the approximate time 112, the current at the output 38 has reached 1000 A flowing from left to right through the inductor 34, and the circuit 20 is switching between states 1 and 2 to maintain the output current at 1000 A. In the illustrated exemplary operation, the above described sequence of states repeats for the next 10 mS cycle (i.e. 100 Hz frequency) of current at the output 38.

Figure 12:
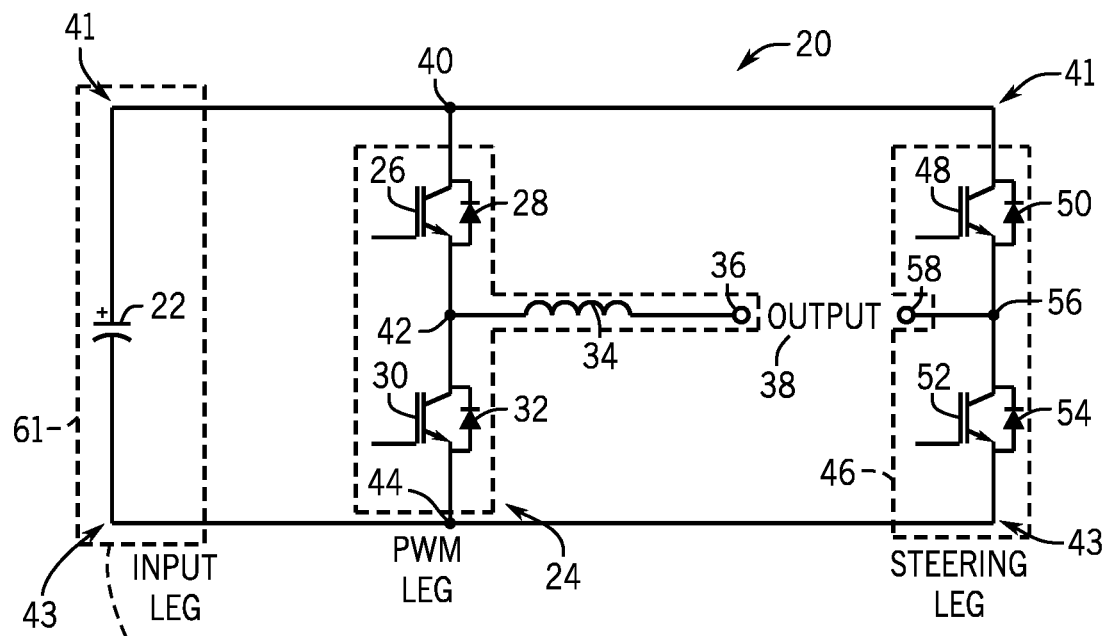
FIG. 12 is a circuit diagram illustrating an exemplary embodiment of the output power control circuit of the welding power supply in accordance with aspects of the present disclosure.

FIG. 12 is a circuit diagram illustrating a further embodiment of the output power control circuit 20 of FIG. 2. It is well known to those skilled in the art that certain welding processes, such as AC GTAW, require a voltage of approximately 200 volts or more during polarity reversal to maintain current flow and prevent arc rectification. Other process, such as AC SAW, may not require this high voltage during polarity reversal, and the embodiment of the output power control circuit 20 illustrated in FIG. 12 may be used. In such processes, the output clamp leg 59, which includes the second capacitor 60 that is configured to function as the output clamp circuit 59 in the embodiment illustrated in FIG. 2, may be eliminated from the output power control circuit 20. Additionally, if the capacitor 60 is eliminated from the output clamp circuit 20, then the blocking diode 62, which was part of the input leg 61 in FIG. 2, is no longer required. Accordingly, in the illustrated embodiment, the output current flows through the capacitor 22 of the input leg 61 during polarity reversal, and the output voltage is clamped to the voltage on capacitor 22.

Figure 13:
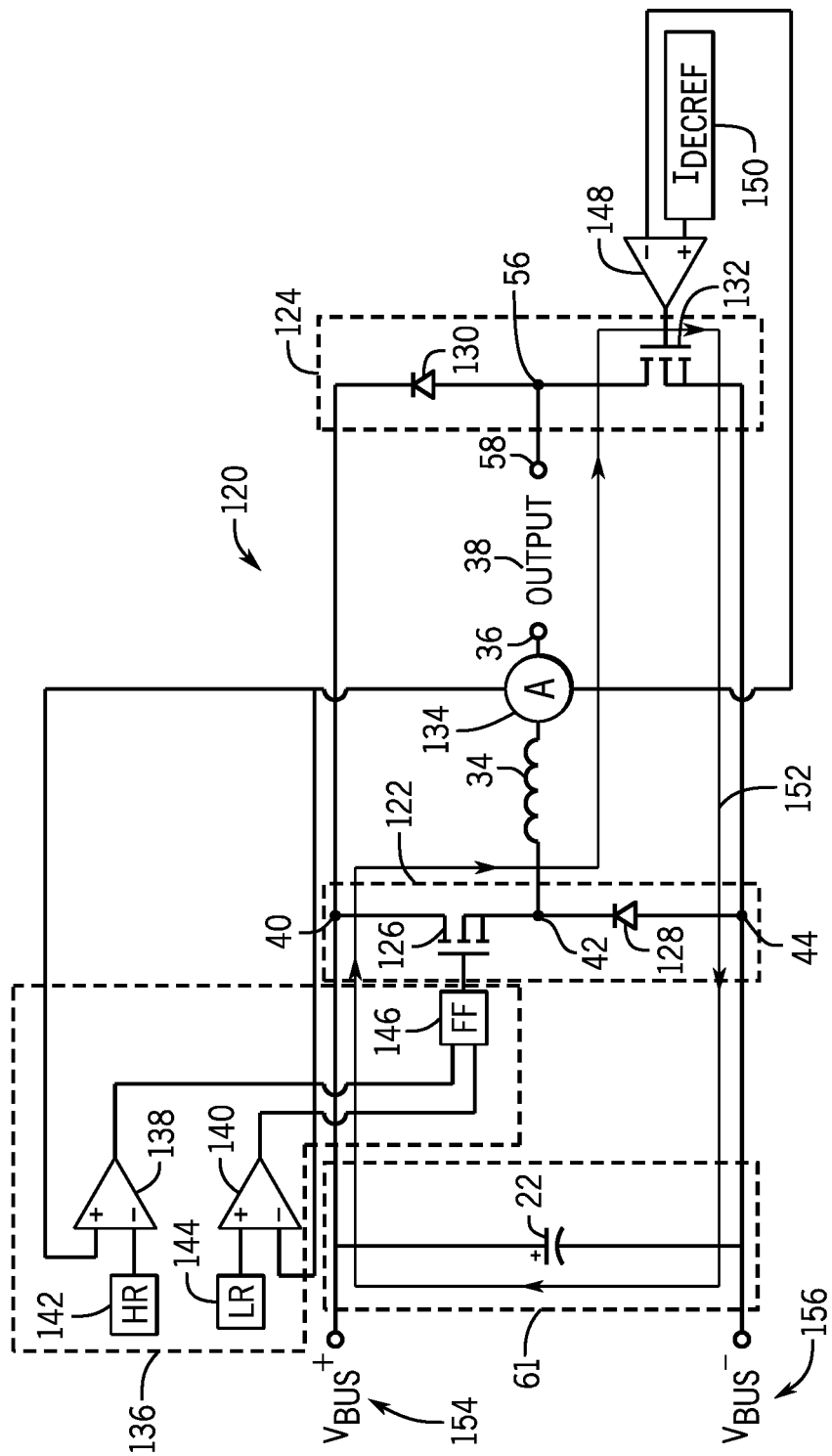
FIG. 13 is a circuit diagram illustrating an additional embodiment of an output control circuit of the welding power supply in accordance with aspects of the present disclosure.

FIG. 13 is a circuit diagram illustrating an additional embodiment of an output control circuit 120 of the welding power supply 10. As illustrated, the output control circuit 120 includes a buck converter 122 and a steering leg 124. The buck converter 122 includes a transistor 126 coupled between the node 40 and the node 42. Additionally, the buck converter 122 includes a freewheel diode 128 coupled between the node 42 and the node 44. Coupled between the first terminal 36 of the output 38 and the node 42 is the inductor 34. The steering leg 124 includes a freewheel diode 130 coupled between the node 40 and the node 56 of the output control circuit 120, and the steering leg 124 also includes a transistor 132 coupled between the node 56 and the node 44. Further, the second terminal 58 of the output 38 is positioned between the freewheel diode 130 and the transistor 132.

As voltage is applied from the node 40, through the transistor 126 and to the inductor 34, a current at the output 38 may increase beyond a current desired for a welding operation. Accordingly, the transistor 126 may pulse width modulate or hysteretically control the voltage applied to the inductor 34 to limit the current flowing to the output 38. To monitor the current at the output 38, a current detector 134 may be positioned at the first terminal 36 of the output 38. When controlling the voltage applied to the inductor 34 using hysteretic control, as illustrated in FIG. 13, the current detector 134 may provide current level indications to a hysteretic controller 136. Additionally, the hysteretic controller may provide signals to the transistor 126 that control the transistor 126 to an on state or an off state to control the voltage applied to the inductor 34.

Further, the hysteretic controller 136 may include a high comparator 138 and a low comparator 140. The current level indications from the current detector 134 may be supplied to both the high comparator 138 and the low comparator 140. Additionally, the high comparator 138 may compare the current level indications to a high reference signal 142, and the low comparator 140 may compare the current level indications to a low reference signal 144. Further, outputs of the comparators 138 and 140 are provided to a flip-flop logic gate 146, which ultimately provides a control signal to the transistor 126. In this manner, the control signal provided to the transistor 126 may control the transistor 126 to an off state (i.e., to decouple the voltage source from the inductor 34) when the current level indications are greater than the high reference signal 142. Moreover, the control signal provided to the transistor 126 may control the transistor 126 to an on state (i.e., to couple the voltage source to the inductor 34) when the current level indications are less than the low reference signal 144 and/or below the high reference signal 142. By coupling the voltage source to the inductor 34, the current flowing to the output 38 via the inductor 34 increases. Further, by decoupling the voltage source from the inductor 34, the current flowing to the output 38 via the inductor 34 decreases.

Figure 15:
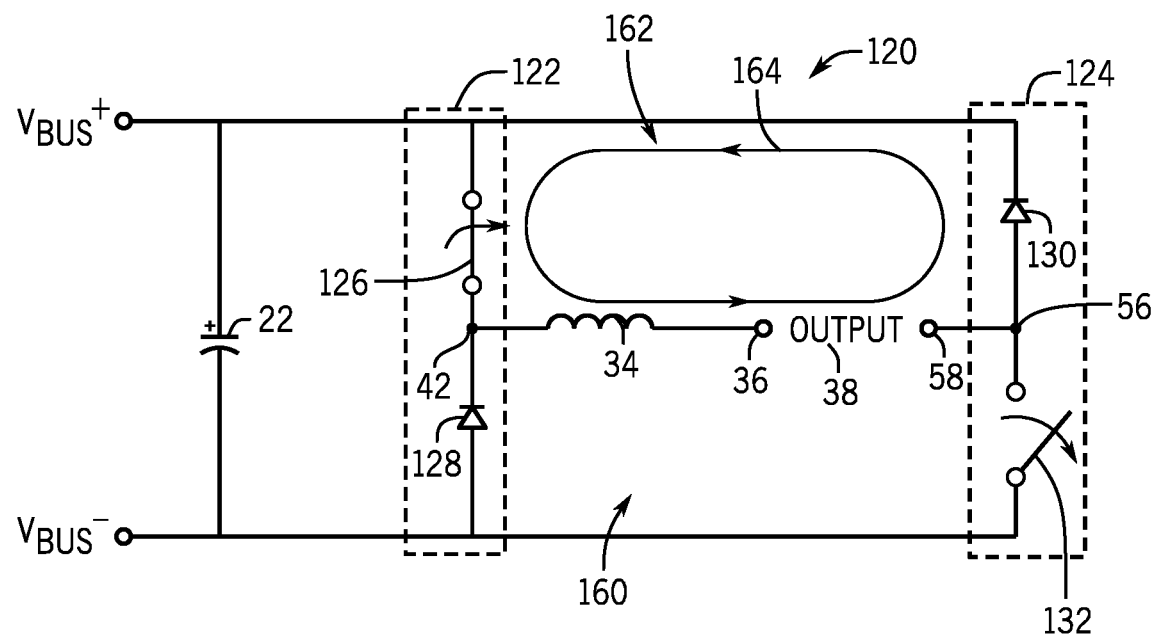
FIG. 15 is a circuit diagram illustrating an embodiment of the output control circuit of FIG. 13 with current flow freewheeling in a high side of the output power control circuit from left to right through the output load in accordance with aspects of the present disclosure.
Figure 16:
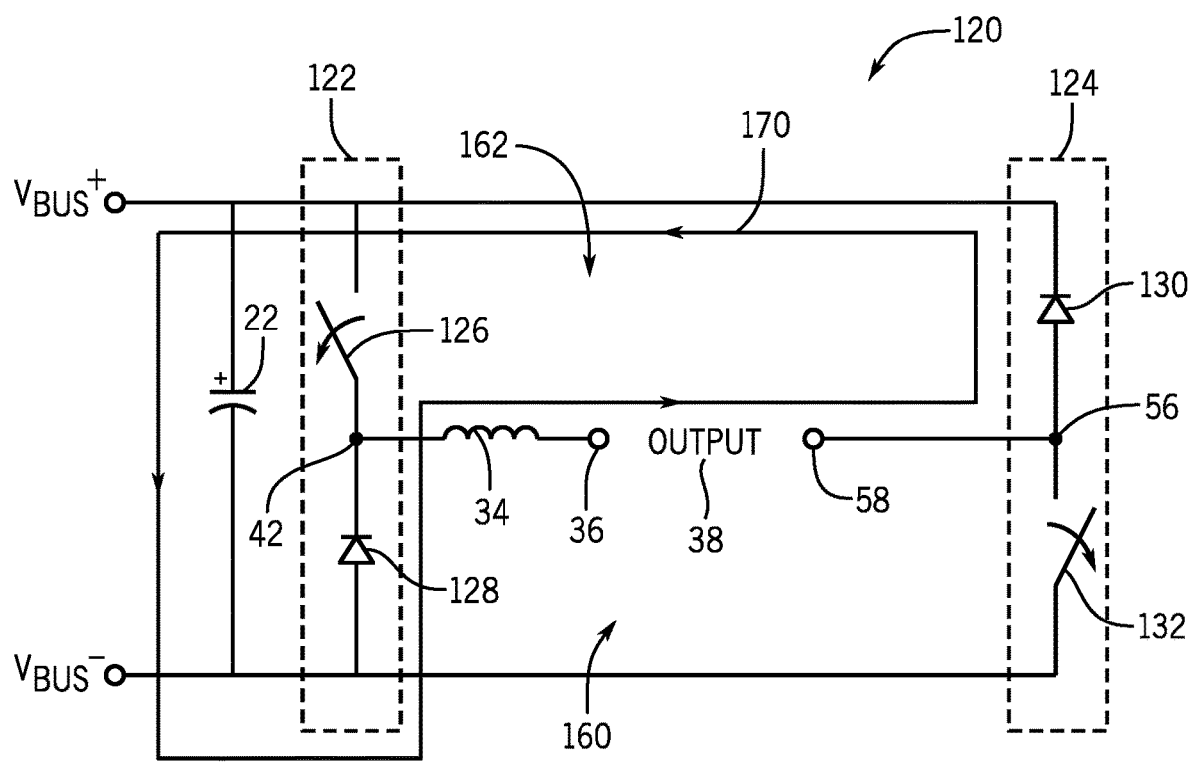
FIG. 16 is a circuit diagram illustrating an embodiment of the output control circuit of FIG. 13 with a high side transistor and a low side transistor in an open position in accordance with aspects of the present disclosure.

In addition to current control by way of the buck converter 122, the steering leg 124 may also influence current control at the inductor 34. For example, the transistor 132 may be controlled to on and off states based on inputs to a comparator 148 to control a fall time of the current at the inductor 34. It may be appreciated that in some embodiments, the comparator 148 may be a part of the hysteretic controller 136. For example, when the current is in a path 170, as described in FIG. 16 below, the voltage input from the voltage source is provided in addition to the voltage of the output 38 to rapidly decrease the current at the inductor 34. Accordingly, when the current level indications from the current detector 134 are compared at the comparator 148 to a current decrease reference value $I_{DECREF}$ 150, an output of the comparator 148 controls whether the current freewheels as illustrated in FIG. 14, whether the current freewheels as illustrated in FIG. 15, whether the current flows as illustrated in FIG. 16, or whether the current flows along path 152 as illustrated in FIG. 13.

By way of example, if the current decrease reference value $I_{DECREF}$ 150 is set to a relatively high value, the output of the comparator 148 may provide a signal to the transistor 132 such that the transistor 132 remains closed under all situations where the current level indications from the current detector 134 remain below $I_{DECREF}$ 150. On the other hand, when $I_{DECREF}$ 150 is set relatively low, or the current level indications from the current detector 134 exceed the current level indications, the comparator 148 may output a low signal that results in the transistor 132 opening. In this situation, the current at the inductor 34 may rapidly decrease due to the combination of the input voltage from an input bus 154 and the voltage of the output 38 applied to the inductor 34. In general, $I_{DECREF}$ 150 may be set to a level sufficiently greater than the high reference signal 142. In this manner, the transistor 132 may not be opened when efficient control of the current across the inductor 34 is accomplished by control of the buck converter 122.

Figure 14:
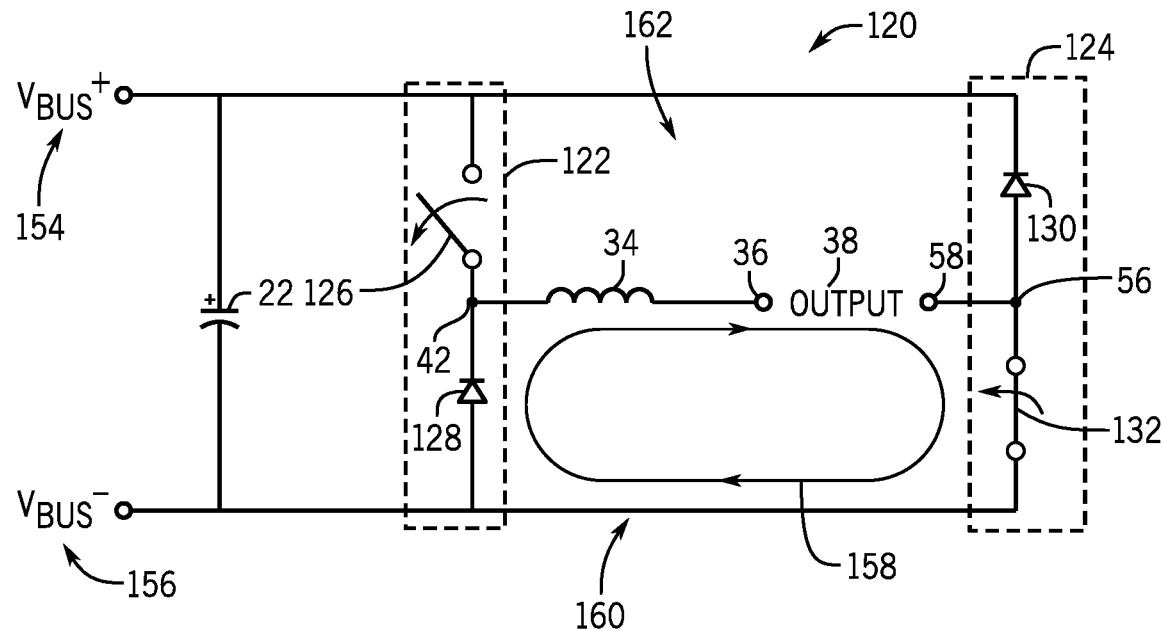
FIG. 14 is a circuit diagram illustrating an embodiment of the output control circuit of FIG. 13 with current flow freewheeling in a low side of the output power control circuit from left to right through the output load in accordance with aspects of the present disclosure.

FIG. 14 is a circuit diagram illustrating the output control circuit 120 with a current flow path 158 freewheeling in a low side 158 of the output control circuit 120 from left to right through the inductor 34 and the output 38. In the illustrated circuit diagram, the transistor 132 is closed, which indicates that the current level indications from the current detector 134 are less than $I_{DECREF}$ 150. Additionally, the transistor 126 is open, which indicates that the current level indications from the current detector 134 are greater than the high reference signal 142. Alternatively, in a PWM embodiment, when the transistor 126 is open, a PWM signal supplied to the transistor 126 is low. Immediately prior to either of these situations occurring, the current at the output 38 may be greater than an ideal welding current, but not sufficiently high for the steering leg 124 to assist in controlling the current to a lower level at a faster rate, as discussed above.

Additionally, because the current path 158 is freewheeling in the low side 160 of the output control circuit 120, the current at the output 38 may decrease at a rate that is represented by the voltage at the output 38 divided by an inductance of the inductor 34. Accordingly, because the voltage from the input bus 154 is not added to the voltage at the output 38, a fall time for the current at the output 38 may be slower than when both the transistors 126 and 132 are open, as discussed below in relation to FIG. 16. The reduced fall rate associated with the current path 158 may be desirable when the current at the output 38 is relatively close to a desired current for a welding operation. In this manner, the transistor 126 may control application of the voltage from the input bus 154 as the current alternates between falling below the high reference signal 142 and increasing above the high reference signal 142.

FIG. 15 is a circuit diagram illustrating the output control circuit 120 with a current flow path 164 freewheeling in a high side 162 of the output control circuit 120 from left to right through the inductor 34 and the output 38. In the illustrated circuit diagram, the transistor 132 is open, which indicates that the current level indications from the current detector 134 are greater than $I_{DECREF}$ 150. Additionally, the transistor 126 is closed, which may indicate that the current level indications from the current detector 134 are less than the high reference signal 142. Accordingly, the current at the output 38 may be in an efficient working range for a welding operation, but $I_{DECREF}$ 150 may have been temporarily set to relatively low value, such as during a power down operation. Therefore, the steering leg 124 is in a configuration to assist in controlling the current to a lower level.

Additionally, because the current path 164 is freewheeling in the high side 162 of the output control circuit 120, the current at the output 38 may decrease at a rate similar to the rate described above in the discussion of FIG. 14. Therefore, controlling either of the transistors 126 or 132 hysteretically or using PWM may result in a similar current reduction rate when one of the transistors 126 or 132 is closed while the other transistor 126 or 132 is open. In the embodiment illustrated in FIG. 15, the transistor 132 may remain open until the current at the output 38 falls below $I_{DECREF}$ 150 so that the current at the output 38 may fall to a desired level. Alternatively, using PWM control of the transistor 132, the transistor 132 may remain open until the PWM control provides a high signal to the transistor 132.

FIG. 16 is a circuit diagram illustrating the output control circuit 120 of FIG. 13 with the transistors 126 and 132 in an open position. With the transistors 126 and 132 in the open position, the freewheel diodes 128 and 130 pass a current flow path 170 from the inductor 34, through the output 38, and back to the capacitor 22. In this manner, a high voltage is provided across the inductor 34. Because di/dt=V/L, and because the high voltage is provided across the inductor 34, the rate of current fall (i.e., di/dt) is much greater than the rate of current fall in FIG. 14 or FIG. 15.

Because the transistor 126 is in an open position, using the hysteretic controller 136 of FIG. 13, the current level indications from the current detector 134 are greater than the high reference signal 142 for the hysteretic controller 136 to provide the signal to open the transistor 126. Additionally, because the transistor 132 is also open, the current level indications from the current detector 134 are also greater than the $I_{DECREF}$ 150 for the comparator 148 to provide the signal to open the transistor 126. Accordingly, when the current is greater than both the high reference signal 142 and $I_{DECREF}$ 150, it may be desirable to decrease the current flow across the inductor 34 in a manner more rapid than when just a single transistor 126 or 132 is in an open position and the current flow, as discussed above in the discussion of FIGS. 14 and 15. Additionally, using PWM control, a low PWM signal applied to both the transistor 126 and the transistor 132 results in both the transistors 126 and 132 in the open position.

Although illustrated in FIGS. 14-16 as including the transistor 126 and the diode 128 positioned in the buck converter 122 such that the transistor 126 is coupled to the high bus (i.e., $V_{bus}^+$) of the output control circuit 120 and the diode 128 is coupled to the low bus (i.e., $V_{bus}^-$) of the output control circuit 120, and including the diode 130 and the transistor 132 positioned in the steering leg 124 such that the diode 130 is coupled to the high bus (i.e., $V_{bus}^+$) of the output control circuit 120 and the transistor 132 is coupled to the low bus (i.e., $V_{bus}^-$) of the output control circuit 120, in other embodiments, the position of the transistor 126 and the diode 128 of the buck converter 122 may be swapped, and the position of the diode 130 and the transistor 132 of the steering leg 124 may be swapped. In other words, in certain embodiments, the diode 128 of the buck converter 122 may be coupled to the high bus (i.e., $V_{bus}^+$) of the output control circuit 120 and the node 42 connecting the output 38 of the output control circuit 120 while the transistor 126 of the buck converter 122 may be coupled to the low bus (i.e., $V_{bus}^-$) of the output control circuit 120 and the node 42 connecting the output 38 of the output control circuit 120, and the transistor 132 of the steering leg 124 may be coupled to the high bus (i.e., $V_{bus}^+$) of the output control circuit 120 and the node 56 connecting the output 38 of the output control circuit 120 while the diode 130 of the steering leg 124 may be coupled to the low bus (i.e., $V_{bus}^-$) of the output control circuit 120 and the node 56 connecting the output 38 of the output control circuit 120. Control of such an embodiment of the output control circuit 120 will be substantially similar to that discussed above with respect to FIGS. 14-16.

FIG. 17 is a circuit diagram illustrating an embodiment of an output control circuit 178 with four-quadrant hysteretic control. The output control circuit 178 includes the transistors 126 and 132, which are also present in the output control circuit 120 of FIGS. 13-16. Additionally, the freewheel diodes 128 and 130 are replaced by transistors 180 and 182 to provide four-quadrant control of the output control circuit 178. The hysteretic controller 136 and the comparator 148 may perform as described above in the discussion of FIG. 13. However, in addition to controlling the transistors 126 and 132, respectively, the hysteretic controller 136 and the comparator 148 may also provide control signals to the transistors 180 and 182, respectively. In general, the transistors 180 and 182 may be opened when the transistors 126 and 132 are closed, and the transistors 180 and 182 may be closed when the transistors 126 and 132 are opened. To accomplish this logic control, an inverter 184 may couple between the transistor 180 and the hysteretic controller 136, and an inverter 186 may couple between the transistor 182 and an output of the comparator 148. In this manner, control signals that are opposite of the control signals provided to the transistors 126 and 132 are provided to the transistors 180 and 182.

In the illustrated embodiment, the path 152 represents the flow of current from the input leg 61 and through the output load 38. As illustrated, the path 152 runs left to right through the output load 38 and from a positive bus 154 to a negative bus 156. Accordingly, the control of the transistors 126, 132, 180, and 182 provides a similar current path to that of FIGS. 3 and 13.

It may be appreciated that while the transistors 180 and 182 are controlled based on control signals received by the transistors 126 and 132, respectively, in some embodiments, each of the transistors 126, 132, 180, and 182 may have individual hysteretic control circuitry. That is, a hysteretic controller 136 may be provided for each of the transistors 126, 132, 180, and 182, and each of the hysteretic controllers 136 may be controlled independently of each other based. Additionally, in another embodiment, the hysteretic controller 136 may control the transistors 126 and 180, as illustrated in FIG. 17, while each of the transistors 132 and 182 have individual comparators 148 for controlling the transistors 132 and 182 independent of each other. Moreover, any combination of the hysteretic controllers 136 and the comparators 148 provided to control the transistors 126, 132, 180, and 182 is also conceived.

Further, while FIG. 17 depicts inverters 184 and 186, it may be appreciated that a switching mechanism may also be used to provide the control signals to the transistors 126, 132, 180, and 186. For example, instead of using the inverter 184, a switching device may switch a high control signal between the transistor 126 and the transistor 180 based on input received from the hysteretic controller 136. In such an embodiment, the transistors 126 and 180 are opened when the high signal is switched away from the gate input of the transistors 126 and 180. This switching may be controlled by the hysteretic controller 136. Similarly, another switching device may be used in place of the inverter 186 and controlled by the comparator 148. While the circuit diagrams of FIGS. 13-17 include the inductor 34 electrically coupled between the buck converter 122 and the output 38, in other embodiments, the inductor 34 may be electrically coupled between the output 38 and the steering leg 124 (e.g., to node 56).

Figure 18:
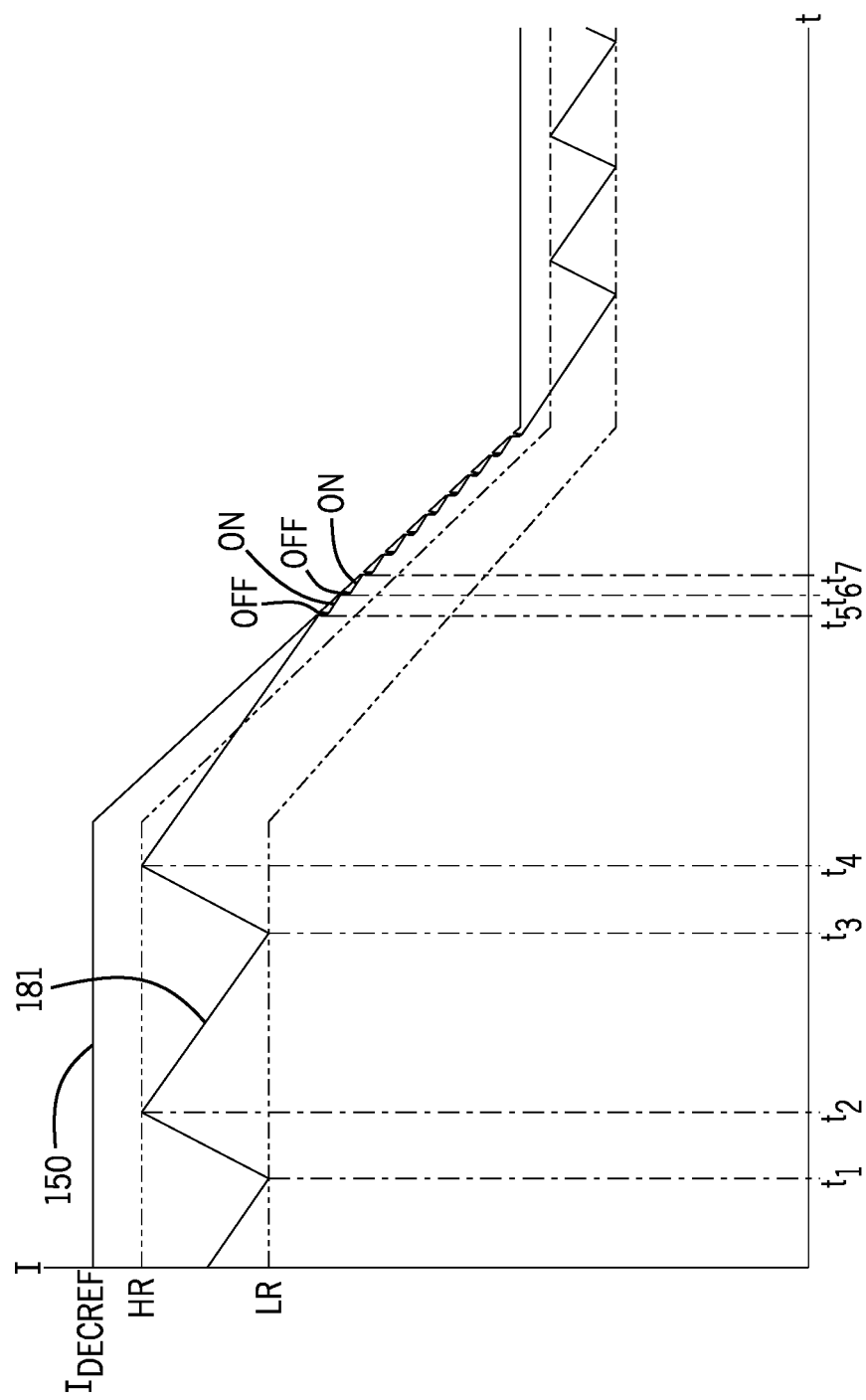
FIG. 18 is a graph of current through an inductor of the output power control circuit measured by a sensor in accordance with aspects of the present disclosure.

FIG. 18 is a graph of current 181 through the inductor 34 measured by the sensor 134 as received by the hysteretic controller 136. The hysteretic controller 136 may output the high reference signal 142, the low reference signal 144, and the $I_{DECREF}$ signal 150 to control the current through the inductor 34 based on the measured current 181. At time t1, the comparators 138 and 140 of the hysteretic controller 136 may control the flow of current 181 through the inductor 34. For example, when the current 181 exceeds the high reference signal 142 at time t2, the transistor 126 may be transitioned to an off state to cause the current 181 through the inductor 34 to decrease. At time t3, when current decreases below the low reference signal 144, the transistor 126 may be transitioned to an on state to cause the current 181 to through the inductor 34 to increase. In this manner, the hysteretic controller 136 may approximate a command signal 183. In some embodiments, the high reference signal 142 and the low reference signal 144 may be a preset difference from the command signal 181.

During times t4-t7, the hysteretic controller 136 may control the steering leg 124 (e.g., transistors 132 and 182 in the embodiment illustrated in FIG. 17) during a decrease in current 181 through the inductor 34. The current 181 may decrease due to any suitable reason, such as during termination of the weld, during a phase of pulsed welding, input from an operator, or the like. At time t4, the current 183 begins to decrease due to control, for example, of the transistors 126 and 180. That is, the hysteretic controller 136 may continue to control the current 136 based on the decreasing high reference signal 142 and the low reference signal 144 by opening and closing the transistors 126 and 180. For example, the hysteretic controller 136 may cause the transistor 126 to be in an off state when the current 183 exceeds the high reference 142.

In some embodiments, the current 181 through the inductor 34 may not decrease at a rate fast enough due to operation of the buck converter 122 alone. To control the rate at which current in the inductor 34 decreases, the comparator 148 of the hysteretic controller 136 may output a signal to control the state of the transistor 132 based on the decreasing $I_{DECREF}$ signal 150 in addition to, for example, the transistors 126 and 180 of the buck converter 122. That is, at time t5, the current 181 may exceed the high reference signal while the transistor 126 is open and the transistor 180 is closed. To further decrease the current 181 through the inductor 34 at a faster rate than from control of the transistors 126 and 180, the comparator 148 of the hysteretic controller 136 may send a control signal to transistor 132 to transition the transistor 132 to an off state when the current 181 exceeds the $I_{DECREF}$ signal. Switching the transistor 132 to the off state causes the current 181 to decrease at a faster rate than if the transistor 132 is in the on state. In some embodiments, the current 181 may not decrease fast enough to fall between the high and low limits or fall below the $I_{DECREF}$ signal while the transistor 132 is in the off state. As such, in some embodiments, the transistor 132 may maintain an off state throughout the decrease in current 181 to enable current 181 to decrease at a faster rate than if the transistor 132 were in an on state. In the illustrated embodiment, if the current decreases at a faster rate than the $I_{DECREF}$ signal, then the transistor 132 may be switched to an on state to control the decrease in current 181. For example, at time t6, the transistors 126 and 132 may be transitioned to an on state when the current 181 decreases below the $I_{DECREF}$ signal. As shown in the illustrated embodiment, there may be some hysteresis in the circuit that alters the reference value when the switch changes states. The process may be repeated at t7 in which the current again exceeds the $I_{DECREF}$ signal 150.

FIG. 19 is a circuit diagram of the output control circuit 178 when the hysteretic controller 136 provides a signal that opens the transistor 126 and closes the transistor 180. Additionally, a comparator controller 188, which includes the comparator 148, provides a signal that opens the transistor 132 and closes the transistor 182. The result of such a control scheme is the path 170 of the current flow that is similar to the path 170 of the current flow illustrated in FIG. 16. As illustrated, the path 170 flows from the negative bus 156 to the positive bus 154, and the path 170 flows from left to right across the output load 38.

With the transistors 126 and 132 in the open position, the transistors 180 and 182 in a closed state provide a current flow path 170 from the inductor 34, through the output 38, and back to the capacitor 22. In this manner, a high voltage is provided across the inductor 34. Because di/dt=V/L, and because the high voltage is provided across the inductor 34, the rate of current fall (i.e., di/dt) is much greater than the rate of current fall in FIG. 14 or FIG. 15, for example. Additionally, as stored energy in the inductor 34 is discharged, stored energy in the capacitor 22 increases until the current across the output 38 reverses.

Accordingly, FIG. 20 is a circuit diagram of the output control circuit 178 when the hysteretic controller 136 provides a signal that opens the transistor 126 and closes the transistor 180, and the current flowing across the output 38 reverses after rapidly decreasing in FIG. 18. The result of a reversal in the current flow path 170 is a path 190 of the current flow. As illustrated, the path 190 flows from the positive bus 154 to the negative bus 156, and the path 190 flows from right to left across the output load 38.

In reversing the flow of current across the output load 38, the current level across the inductor 34 may increase in a negative direction until the hysteretic controller 136 and/or the comparator controller 188 control the current level to a steady state and/or back toward a zero current state. As the current across the inductor 34 increases, the energy stored in the capacitor 22 may decrease. Additionally, controlling the current level to a steady state or toward zero may occur in a manner similar to the control for the current path 152 described in relation to FIGS. 13 and 17. Further, the output control circuit 178 may generally cycle back and forth between a positive current across the inductor 34 and a negative current across the inductor 34 using the methods described above.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding or cutting circuit, comprising:
   an input leg comprising a capacitor coupled between a high bus and a low bus;
   a buck converter coupled in parallel with the input leg, wherein the buck converter comprises a first transistor, a first diode, and an output electrically coupled to a node between the first transistor and the first diode, and wherein the buck converter is configured to convert input voltage to current in an inductor coupled to the output of the buck converter;
   a steering leg coupled in parallel with the input leg and comprising a second transistor, wherein the steering leg is configured to control a rate at which the current in the inductor decreases; and
   a hysteretic controller configured to:
      control the first transistor to selectively couple the inductor to the high bus or the low bus based on a comparison of a) the current in the inductor to b) a first reference; and
      control the second transistor to control the rate at which the current in the inductor decreases based on a comparison of a) the current in the inductor to b) a second reference.

2. The welding or cutting circuit of claim 1, wherein steering leg is configured to control the rate at which the current in the inductor decreases by controlling a path through which the current flows in the welding or cutting circuit.

3. The welding or cutting circuit of claim 1, wherein the steering leg comprises a second diode.

4. The welding or cutting circuit of claim 3, wherein a node between the second transistor and the second diode is configured to couple to an output load.

5. The welding or cutting circuit of claim 3, wherein the first transistor and the second diode are each coupled to the high bus, and the first diode and the second transistor are each coupled to the low bus.

6. The welding or cutting circuit of claim 3, wherein the first transistor and the second diode are each coupled to the low bus, and the first diode and the second transistor are each coupled to the high bus.

7. The welding or cutting circuit of claim 3, wherein the first transistor is configured to open when the current in the inductor is greater than a first current threshold value.

8. The welding or cutting circuit of claim 3, wherein the second transistor is configured to open when the current in the inductor is greater than a current threshold value.

9. The welding or cutting circuit of claim 8, wherein the hysteretic controller is configured to output the current threshold value.

10. The welding or cutting circuit of claim 1, wherein the buck converter is configured to pulse width modulate the input voltage and provide the pulse width modulated input voltage to the inductor.

11. A method comprising:
    controlling voltage from a voltage input leg of a welding or cutting circuit by switching a first transistor of the welding or cutting circuit between an open configuration and a closed configuration to control a level of current through an inductor and an output of the welding or cutting circuit, wherein the first transistor is arranged in series with a first diode in a buck converter formation of the welding or cutting circuit, and the inductor extends from a node between the first transistor and the first diode to an output load of the welding or cutting circuit; and
    controlling a current flow through the inductor and the output of the welding or cutting circuit at least in part by switching a second transistor of the welding or cutting circuit between an open configuration and a closed configuration, wherein the controlling of the current flow comprises controlling a rate at which the current in the inductor increases or decreases.

12. The method of claim 11, comprising controlling switching of the first transistor and the second transistor via a pulse width modulation signal.

13. The method of claim 11, comprising increasing a fall rate of an output current by controlling the first transistor and the second transistor to the open configuration.

14. The method of claim 11, comprising controlling switching of the first transistor based on at least one comparison between a measured output current and a reference signal.

15. The method of claim 11, comprising controlling switching of the second transistor based on at least one comparison between a measured output current and a current command value, wherein the current command value is adjustable during an operation of the welding or cutting circuit.

16. The method of claim 11, comprising controlling switching of the first transistor and the second transistor based on at least a measured output current.

17. A welding or cutting circuit, comprising:
    an input leg comprising a capacitor coupled between a high bus and a low bus;
    a buck converter coupled in parallel with the input leg, wherein the buck converter comprises a first transistor, a second transistor, and an output electrically coupled to a node between the first transistor and the second transistor, and wherein the buck converter is configured to convert input voltage to current in an inductor coupled to the output of the buck converter;
    a steering leg coupled in parallel with the input leg and comprising a third transistor and a fourth transistor, wherein the steering leg is configured to control a rate at which the current in the inductor decreases; and
    a hysteretic controller configured to:
       control the first and second transistors to selectively couple the inductor to the high bus or the low bus based on a comparison of a) the current in the inductor to b) at least one of a high reference or a low reference; and
       control the third and fourth transistors to control the rate at which the current in the inductor decreases based on a comparison of a) the current in the inductor to b) a third reference.

18. The welding or cutting circuit of claim 17, wherein the steering leg is configured to control the rate at which the current in the inductor decreases by controlling a path through which the current flows in the welding or cutting circuit.

19. The welding or cutting circuit of claim 18, wherein the steering leg is configured to reverse a direction of the path through which the current flows across the inductor.

20. The welding or cutting circuit of claim 17, wherein a node between the third transistor and the fourth transistor is configured to couple to an output load.

21. The welding or cutting circuit of claim 17, wherein the hysteretic controller comprises a current sensor coupled to the output and a comparator that controls the third transistor and the fourth transistor based on the comparison between a) the current in the inductor as measured by the current sensor and b) a current command value.

22. The welding or cutting circuit of claim 17, comprising a current sensor coupled to the output, wherein the buck converter is hysteretically controlled via the hysteretic controller coupled to the current sensor and the first transistor.

23. The welding or cutting circuit of claim 17, comprising a current sensor coupled to the output, wherein the buck converter and the steering leg are hysteretically controlled based on a signal provided by the current sensor.

24. The welding or cutting circuit of claim 1, wherein the hysteretic controller includes a high comparator and a low comparator.

25. The welding or cutting circuit of claim 24, wherein the high comparator is configured to output a first signal based on the comparison of the current in the inductor to the first reference, and further comprising a low comparator configured to output a second signal based on a comparison of the current in the inductor to a third reference, wherein the first reference is representative of a higher current than the third reference, and the hysteretic controller is configured to control the first transistor based on the first and second signals.

* * * * *